US012625367B2

(12) United States Patent (10) Patent No.: US 12,625,367 B2
Hirata et al. (45) Date of Patent: May 12, 2026

(54) AIR FLOATING VIDEO DISPLAY APPARATUS AND LIGHT SOURCE

(71) Applicant: Maxell, Ltd., Kyoto (JP)

(72) Inventors: Koji Hirata, Kyoto (JP); Koji Fujita, Kyoto (JP); Toshinori Sugiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 415 days.

(21) Appl. No.: 18/268,612

(22) PCT Filed: Dec. 1, 2021

(86) PCT No.: PCT/JP2021/044151
§ 371 (c)(1),
(2) Date: Jun. 21, 2023

(87) PCT Pub. No.: WO2022/138036
PCT Pub. Date: Jun. 30, 2022

(65) Prior Publication Data
US 2024/0061240 A1 Feb. 22, 2024

(30) Foreign Application Priority Data

Dec. 25, 2020 (JP) ................................. 2020-217259

(51) Int. Cl.
*G02B 27/01* (2006.01)
*B60K 35/21* (2024.01)
(Continued)

(52) U.S. Cl.
CPC ........ *G02B 27/0101* (2013.01); *B60K 35/211* (2024.01); *B60K 35/22* (2024.01);
(Continued)

(58) Field of Classification Search
None
See application file for complete search history.

(56) References Cited

U.S. PATENT DOCUMENTS

2007/0279551 A1* 12/2007 Umebayashi ........ G02B 6/0055
349/65
2016/0195719 A1 7/2016 Yonetani
2018/0024373 A1* 1/2018 Joseph ................... G02B 30/56
359/629

FOREIGN PATENT DOCUMENTS

JP 4788882 B2 10/2011
JP 2015-194707 A 11/2015
(Continued)

OTHER PUBLICATIONS

International Search Report and Written Opinion mailed on Feb. 22, 2022, received for PCT Application PCT/JP2021/044151, filed on Dec. 1, 2021, 9 pages including English Translation.

*Primary Examiner* — Shan Liu
(74) *Attorney, Agent, or Firm* — XSENSUS LLP

(57) ABSTRACT
A compact air floating video display apparatus providing a highly visually recognized air floating video less susceptible to external light and having fewer ghosts is provided. The air floating video display apparatus includes: an opening portion having a transparent member configured to transmit video light of a specific polarization wave therethrough; a display panel serving as a video source; a light source configured to supply light having specific polarization directionality to the video source; a retroreflection optical member having a retroreflection surface provided with a waveplate; one or more reflection mirrors; a polarization splitter arranged in a space connecting the video source and the retroreflection optical member.

31 Claims, 18 Drawing Sheets

(51)  Int. Cl.
    *B60K 35/22*        (2024.01)
    *B60K 35/23*        (2024.01)
    *B60K 35/28*        (2024.01)
    *B60K 35/50*        (2024.01)
    *B60K 35/60*        (2024.01)

(52)  U.S. Cl.
    CPC .............. *B60K 35/23* (2024.01); *B60K 35/28*
        (2024.01); *B60K 35/50* (2024.01); *B60K 35/60*
                (2024.01)

(56)  References Cited

FOREIGN PATENT DOCUMENTS

| JP | 2019-101055 A | 6/2019 |
|----|---------------|--------|
| JP | 2019-109407 A | 7/2019 |
| JP | 2020-134843 A | 8/2020 |

* cited by examiner ( A )

( B )

( A )

( B )

REFLECTION LIGHT
OF PRINCIPAL RAY
OF VIDEO LIGHT
6002

EXTERNAL LIGHT
6000

OBLIQUE RAY OF VIDEO LIGHT
6003

SURFACE ROUGHNESS
OF RETROREFLECTION
SURFACE   6010

PRINCIPAL RAY OF VIDEO LIGHT
6001

REFLECTION LIGHT
OF OBLIQUE RAY
OF VIDEO LIGHT 6004

2c

2b

2

2a (A)

(B)

( A )

( B )

( A )

( B )

( A )

( B )

( C )

REFLECTANCE OF P POLARIZATION LIGHT AND S POLARIZATION LIGHT ON GLASS

AIR FLOATING VIDEO DISPLAY APPARATUS AND LIGHT SOURCE

CROSS-REFERENCE TO RELATED APPLICATIONS

The present application is based on PCT filing PCT/JP2021/044151, filed Dec. 1, 2021, which claims priority to JP 2020-217259, filed Dec. 25, 2020, the entire contents of each are incorporated herein by reference.

TECHNICAL FIELD

The present invention relates to a technique for an air floating video display apparatus for displaying an air floating video to a driver of an automobile, a train, an aircraft, or the like (also referred to as a "vehicle"), and relates to a technique for an air floating video display apparatus using an optical system enabling the driver to view an image of the air floating video as an actual image.

BACKGROUND ART

A so-called head-up display (HUD) apparatus is known as a video display apparatus configured to project video light onto a windshield or a combiner of a vehicle to form a virtual video to display, for example, traffic information such as automobile route information or traffic jam information, and/or automobile information such as fuel level or coolant temperature. Japanese Patent Application Laid-open Publication No. 2015-194707 (Patent Document 1) discloses an example of the HUD apparatus.

RELATED ART DOCUMENTS

Patent Documents

Patent Document 1: Japanese Patent Application Laid-open Publication No. 2015-194707
Patent Document 2: Japanese Patent No. 4788882

SUMMARY OF THE INVENTION

Problems to be Solved by the Invention

A video display apparatus of this type has been desired to expand a region in which the driver can view a virtual video, while high visual recognition and high resolution of the virtual video are also important performance factors. In addition, some HUDs can perform augmented reality (AR) display where the virtual video is overlaid on the actual image visually recognized by the driver while setting a virtual video producing position more distant from a line of sight of a driver in order to reduce driver's line-of-sight movement. Such an HUD involves a problem where the apparatus or system set is increased in size in order to set the virtual video generating position distant and to achieve high magnification.

Furthermore, the above-described HUD apparatus provides the video displayed on the video display apparatus such as a liquid crystal display as the magnified video of the virtual video to the driver by using an optical system including a concave mirror (having a function of a convex lens). As shown in FIG. 2, the windshield 6 of the automobile has a curvature radius "Rv" in a vertical direction of a body and a curvature radius "Rh" in a horizontal direction of the body that are different from each other, and a relation of "Rh>Rv" is generally established. Therefore, as shown in FIG. 22, in the related-art HUD, when the windshield 6 is regarded as the reflection surface, the reflection surface becomes a toroidal surface of the concave mirror 401. Therefore, in the related-art HUD, the shape of the concave mirror 401 is designed to correct the virtual video magnification based on the shape of the windshield 6. In other words, the shape of the concave mirror 401 have an average curvature radius that is different between the horizontal direction and the vertical direction so as to correct the difference between the curvature radius Rv in the vertical direction and the curvature radius Rh in the horizontal direction of the windshield 6.

As described above, since the windshield is used as a final reflection surface, a vehicle such as an automobile which assigns importance to designability involves the following problems. Specifically, (1) the design may change until just before mass production, which makes it difficult to finalize design specification, and (2) automobiles have different designs from one another, which makes it difficult to apply an HUD apparatus having the same specification to other automobile models. This application difficulty has hindered HUD market growth. In addition, external light such as sunlight entering the HUD apparatus at a certain angle through the windshield may be collected by the concave mirror 401 and enter a liquid crystal display panel 404. In that case, in order to prevent damage on an emission-side polarization plate of the liquid crystal display panel 404, it is necessary to take a countermeasure such as optimization of a reflection property of the concave mirror 401, and/or arrangement of an optical element 403 configured to reflect a specific polarization wave.

An objective of the present invention is to provide a suitable air floating video display apparatus in view of the above-described problems.

Means for Solving the Problems

In order to solve the above-described problems, for example, configurations recited in claims are employed. An air floating video display apparatus according to an embodiment is an air floating video display apparatus forming an air floating video, and includes: an opening portion configured to transmit video light of a specific polarization wave forming the air floating video therethrough; a transparent member arranged at the opening portion and configured to transmit the video light therethrough; a display panel serving as a video source; a light source configured to supply light having specific polarization directionality to the video source; a retroreflection optical member having a retroreflection surface provided with a waveplate; one or more reflection mirrors; and a polarization splitter in a space connecting the video source and the retroreflection optical member.

In the air floating video display apparatus according to an embodiment, video light of a specific polarization wave emitted from the video source is once transmitted through the polarization splitter, the video light transmitted through the polarization splitter is reflected by a first reflection mirror serving as the reflection mirror toward the retroreflection optical member, the video light reflected by the first reflection mirror is converted in terms of light polarization by the retroreflection optical member to convert one polarization wave of the video light to another polarization wave, the converted video light is reflected again by the first reflection mirror, the video light reflected again by the first reflection mirror is reflected by the polarization splitter toward the opening portion, the air floating video that is an actual image based on the video light reflected by the polarization splitter is displayed outside the transparent member of the opening portion, and a forming position of the air floating video is changed by a structure changing a distance from the video source to the retroreflection optical member.

Effects of the Invention

According to a typical embodiment of the present invention, a suitable air floating video display apparatus can be provided. A problem, a configuration, and an effect other than those described above will be described in a chapter <DETAILED DESCRIPTION OF PREFERRED EMBODI-MENTS>.

BRIEF DESCRIPTIONS OF THE DRAWINGS

DETAILED DESCRIPTION OF PREFERRED EMBODIMENTS

<Related-Art Air Floating Video Display Apparatus>

Figure 6:
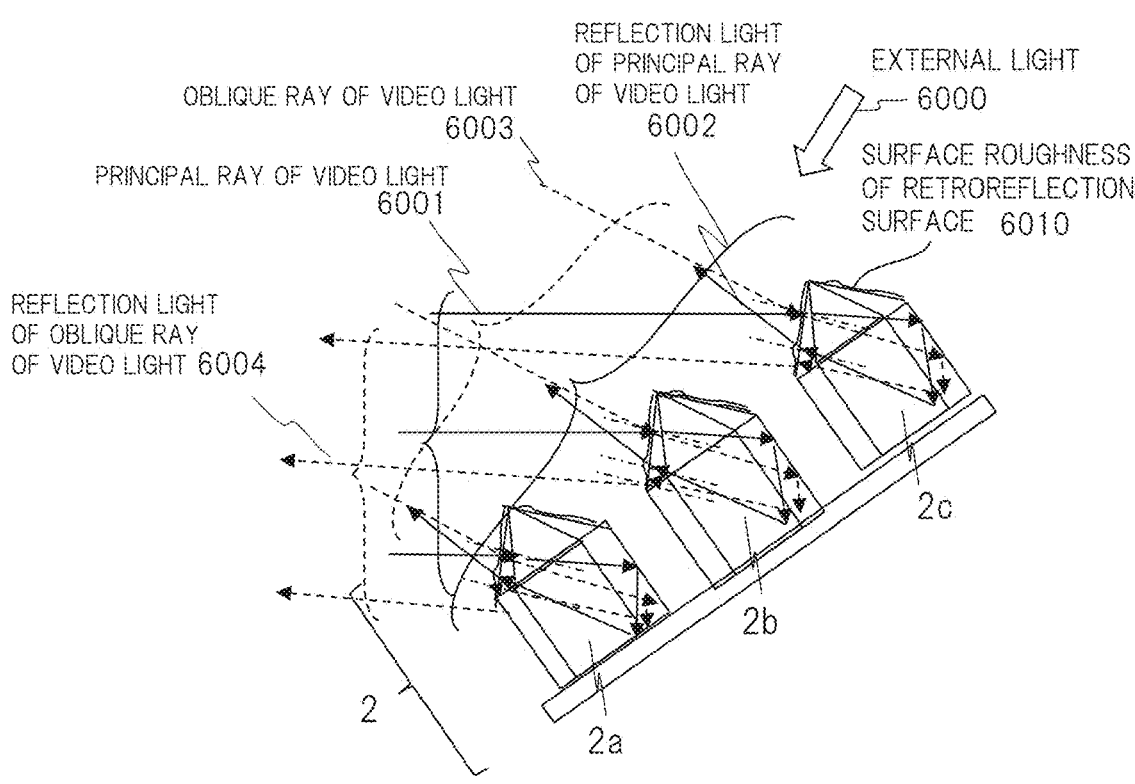
FIG. 6 is a diagram showing a problem of an air floating video display apparatus.

In a related-art air floating video display apparatus, an organic EL panel or a liquid crystal display panel as a high-resolution color display video source is combined with a retroreflection optical member. In this air floating video display apparatus, as shown in FIG. 6, video light emitted from the liquid crystal panel that is a video light source has a wide-angle diffusion property, and the retroreflection optical member is hexahedral, and therefore, a ghost image is generated because of reflected light 6004 generated by video light 6003 obliquely entering a retroreflection optical member 2a in addition to reflected light 6002 generated by normal video light 6001, and this loses the video quality of the air floating video. Since the retroreflection optical member shown as a related-art example is hexahedral, a plurality of ghost images from a first ghost image G1 to a sixth ghost image G6 (not illustrated) are generated in addition to the normal air floating video R1. This causes such a big problem that a person other than a viewer also views a ghost image that is the same air floating video, and the resolution of the air floating video apparently significantly decreases, or the like. Note that an example of a structure for achieving retroreflection using reflection caused by the hexahedron shown in FIG. 6 has been described here. There are not only the above-described problem but also a problem that is generation of a ghost image because of a similar reason in an optical member providing a retroreflected video by at least two or more reflections causing retroreflection. The hexahedron having the protrusion-shaped reflection surface has been described above. However, it can be also said that a hexahedron having a concaved reflection surface relative to its surroundings provides a similar effect.

Figure 7:
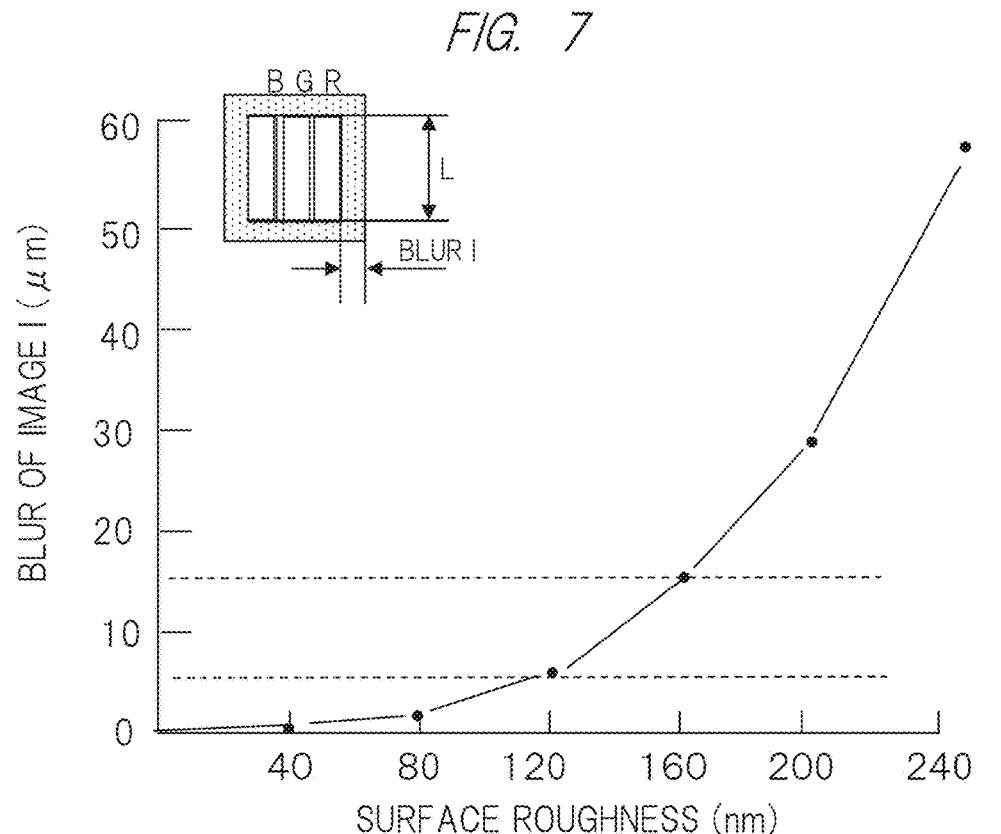
FIG. 7 is a characteristic diagram showing a relation between a surface roughness of a retroreflection optical member and a blur amount of a retroreflected video.

In addition, there is a configuration in which video light from a display apparatus having a narrow-angle directionality property described later is reflected by a retroreflection optical member to form the air floating video. According to an experiment by the inventors, in the resultant air floating video, not only the ghost image described above but also a blur have been visually recognized for each pixel of a liquid crystal display panel as shown in FIG. 7.

<Outline of Air Floating Video Display Apparatus>

Figure 1:
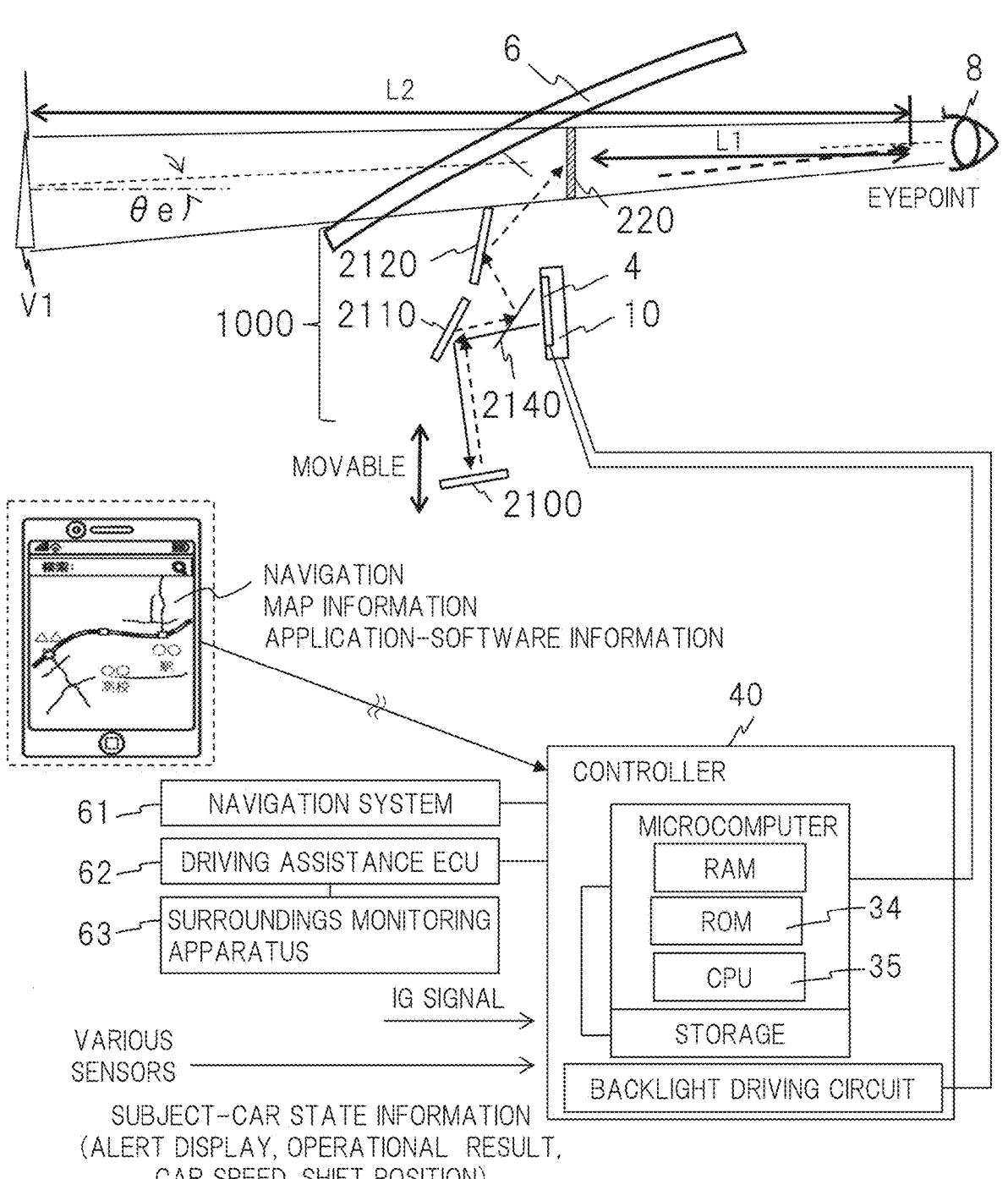
FIG. 1 is a diagram showing an example of a usage mode of an air floating video display apparatus according to an embodiment of the present invention.
Figure 2:
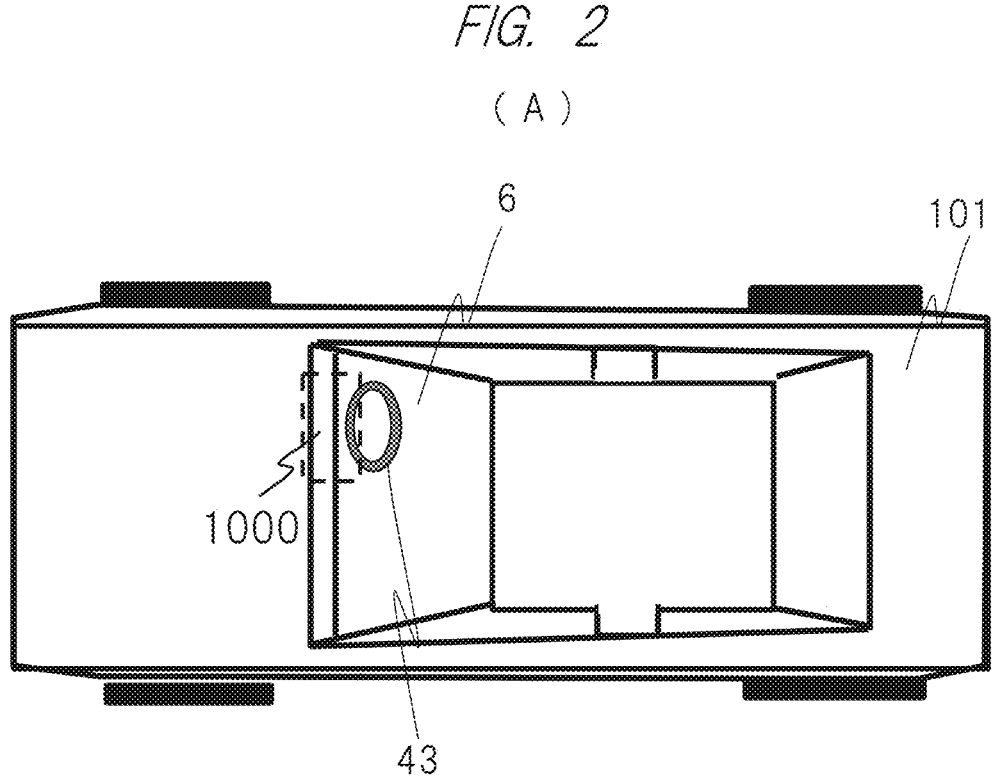
FIG. 2 is a plan view of an automobile mounted with an air floating video display apparatus and an exemplary diagram for explaining a difference in curvature radius of a windshield.
Figure 2:
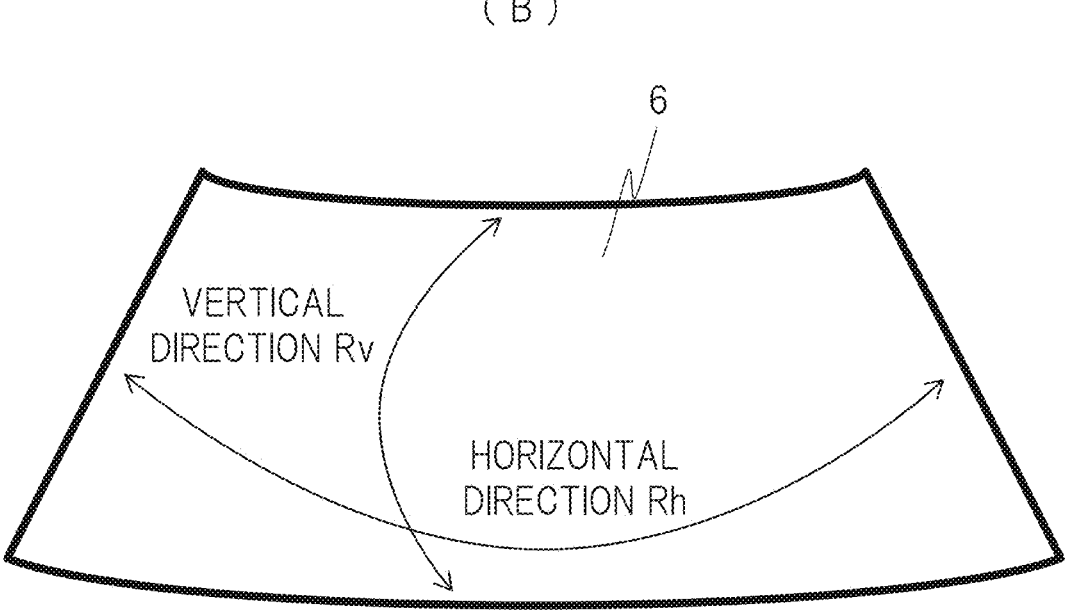

FIG. 1 is a schematic configuration diagram for explaining superiority of using the air floating video display apparatus of the present invention for an automobile. As an example of this case, an air floating video display apparatus 1000 configured to provide the air floating video without using the windshield 6 of the automobile will particularly be described here. The air floating video display apparatus 1000 provides an air floating video 220 in an interior space of a subject vehicle (host vehicle) at an eye point 8 (which will be detailed later) corresponding to a driver's line of sight. This provides a visual effect similar to virtually forming a virtual video V1 in front of the subject vehicle. The inventors have verified this by experiment. The details will be described below.

As shown in FIG. 1, when the air floating video 220 is viewed at the eye point 8, the air floating video 220 (the corresponding virtual video V1) can be overlaid on an actual view visually recognized by the driver as similar to a case in the related-art HUD of view of the virtual video V1 reflected by a projected member 6 (that is an inner surface of the windshield in the present embodiment and a surface facing the driver in the vehicle). Information displayed as the air floating video 220 includes, for example, the vehicle information, information of front view captured by a camera (not illustrated) such as a monitor camera or an around viewer, and/or information of scenery around the vehicle before start, a speedometer, an engine tachometer, a remaining energy level display and the like.

In addition, in the present embodiment, the air floating video display apparatus 1000 includes: a video display apparatus 4 configured to display the video corresponding to the information to project the corresponding video light; and a retroreflection optical member 2100 (namely a retroreflection optical element) configured to reflect the video displayed on the video display apparatus 4 to form the air floating video 220. The retroreflection optical member 2100 has a spatially movable structure (illustrated as being vertically movable in the drawing), and can move a forming position of the air floating video 220 (vertically in the drawing) when being vertically moved. Consequently, a depression angle θe changes when the forming position of the air floating video 220 viewed by the driver through an eye box (which refers to a predetermined space containing the eye point 8) vertically moves. This provides an effect equivalent to changing the display position of the virtual video in the related-art HUD. In addition, by detecting movement of the driver's line of sight (the eye point 8) while using, for example, a monitor camera (not illustrated) in the vehicle, the display position of this air floating video 220 can also be moved vertically and horizontally in accordance with this movement of the line of sight.

In the present embodiment, the forming position of the air floating video 220 is set at a higher position than an upper surface (not illustrated) of a dashboard of the vehicle. Therefore, in the configuration of the present embodiment, an optical distance from the video display apparatus 4 to the retroreflection optical member 2100 is increased by causing a reflection mirror (namely a turning mirror) 2110 arranged in a light path between the video display apparatus 4 and the retroreflection optical member 2100 to turn over the video light emitted from the video display apparatus 4 once. By this configuration, the position of the air floating video 220 provided after being reflected by the retroreflection optical member 2100 can be set at a higher position vertically in the drawing so as to correspond to a virtual video at a distant position as viewed from the driver.

First Embodiment of Air Floating Video Display Apparatus

Figure 3:
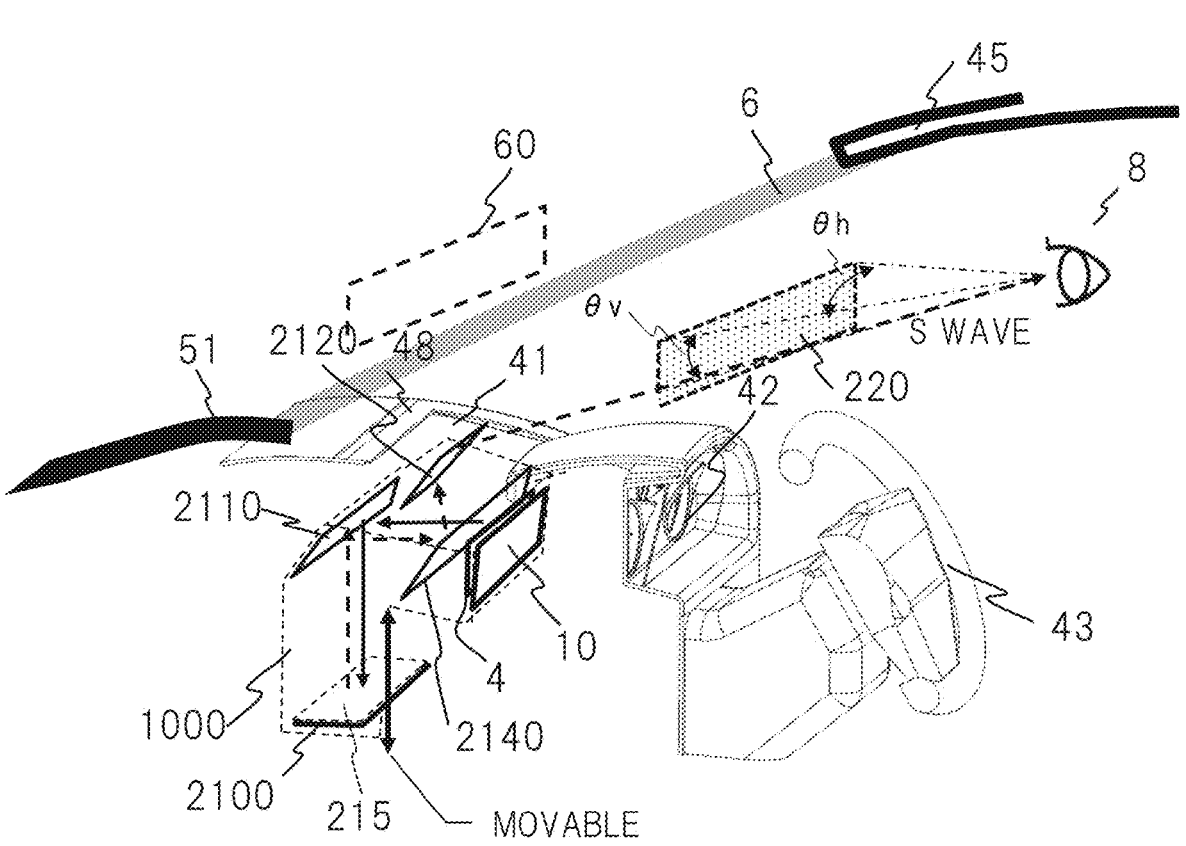
FIG. 3 is a diagram showing a first embodiment of a main part configuration when the air floating video display apparatus is installed in an automobile.

With reference to FIG. 3, a first embodiment of the air floating video display apparatus for in-vehicle use of the invention of the present application will be described below. In this embodiment, note that the air floating video display apparatus 1000 is built in a dashboard 48. The air floating video display apparatus 1000 includes a video display apparatus 4, a retroreflection optical member 2100, and the like. A liquid crystal display panel configured to modulate light supplied from a light source 10 in accordance with a video signal and emit the light as light of a specific polarization wave is used as the video display apparatus 4. A video image of a specific polarization wave (here S-polarization wave) modulated by this liquid crystal display panel is transmitted through a beam splitter or reflection-type light polarizer 2140 configured to transmit S-polarization light but reflect P-polarization light, enters a reflection mirror 2110, is reflected by the retroreflection optical member 2100 arranged on a bottom surface of the air floating video display apparatus 1000, and forms the air floating video 220. A λ/4 waveplate 215 is arranged on a video light entering surface of the retroreflection optical member 2100. The S-polarization video light is converted to the P-polarization light when being transmitted through the λ/4 waveplate 215 twice by entering and then being reflected by the retroreflection optical member 2100. The light path of the P-polarization video light is turned back by the reflection mirror 2110, the P-polarization video light is reflected by the beam splitter or reflection-type polarization plate 2140, and is reflected by a reflection mirror 2120 arranged on the upper side of the air floating video display apparatus 1000. This video light is emitted through an opening portion 41 arranged in the dashboard 48, so that the air floating video 220 can be formed at an illustrated position (a position being inside the vehicle as well as being in front of the windshield 6). An image forming position of the resultant air floating video is formed on a line segment connecting the reflection mirror 2120 and the line of sight, and the video image can be overlaid as an actual image on an actual scenery observed by the driver during driving as similar to the related-art AR-HUD when the video image is formed on the upper side of the mirror's upper end. At this time, the window glass is not used as the optical system as different from the related-art HUD, and therefore, the air floating video display apparatus is unsusceptible to variations in the curvature radius and/or inclination of the window glass due to the automobile design, and is excellent in applicability to different automobile models.

Figure 20:
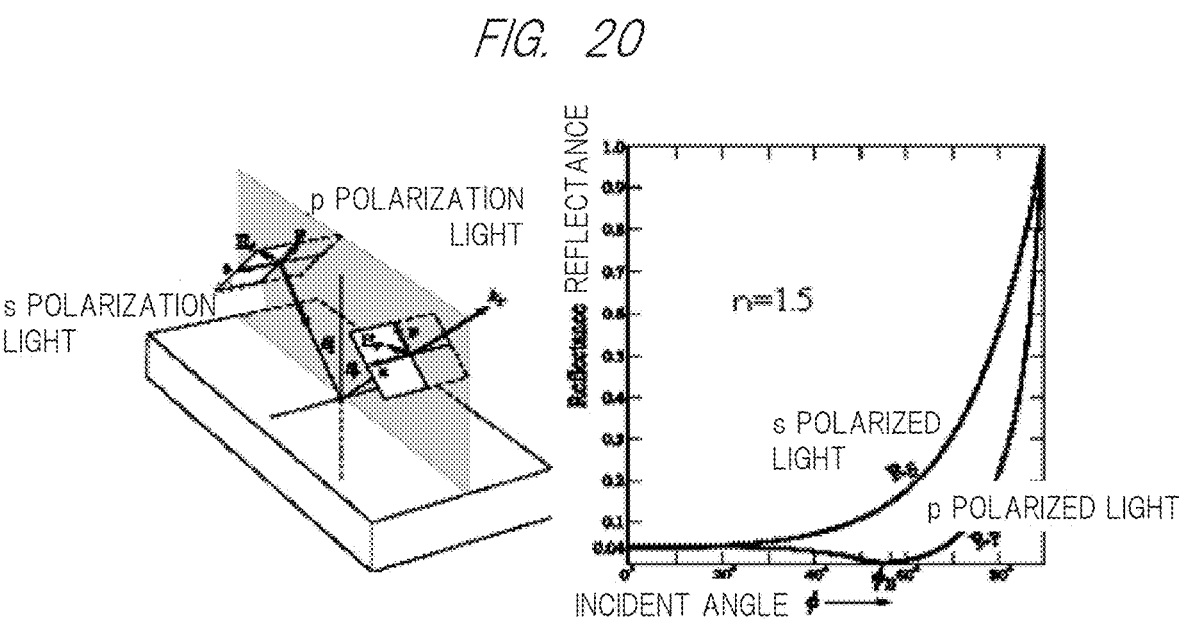
FIG. 20 is a characteristic diagram showing reflection properties of glass relative to an incident angle of a light ray, based on different polarization components.
Figure 20:

A reflection film resulted from coating with a metal reflection film or depositing the metal reflection film by a sputter, a beam splitter configured to selectively reflect a specific polarization wave, or a reflection-type light polarizer can be used as the reflection mirror 2120. Thus, the reflection mirror 2120 has the following function. When the incident angle of components of external light such as sunlight entering through the windshield 6 is large, the reflectance of the S-polarization light is high as shown in FIG. 20. Therefore, a P-polarization component enters the vehicle. The reflection mirror 2120 selectively reflects this P-polarization component. Therefore, no external light enters optical components (each component within an enclosure of the air floating video display apparatus 1000, the video display apparatus 4 (the liquid crystal display panel), the beam splitter or reflection-type light polarizer 2140, and the retroreflection optical member 2100, and the like) at a stage behind (below in the drawing) the reflection mirror 2120. Thus, the reliability of the optical components, the video display apparatus 4 (the liquid crystal display panel) and a polarization plate (not illustrated) arranged at a video light emission side of the liquid crystal display panel, and/or the like, is not degraded.

Figure 21:
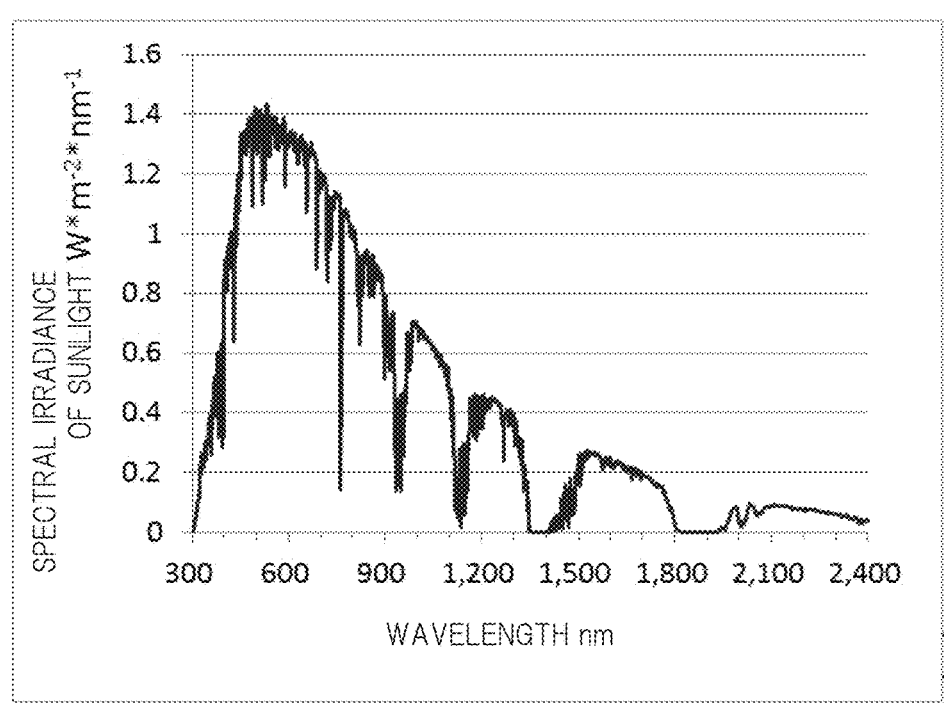
FIG. 21 is a characteristic diagram showing a spectral irradiance of sunlight.
Figure 22:
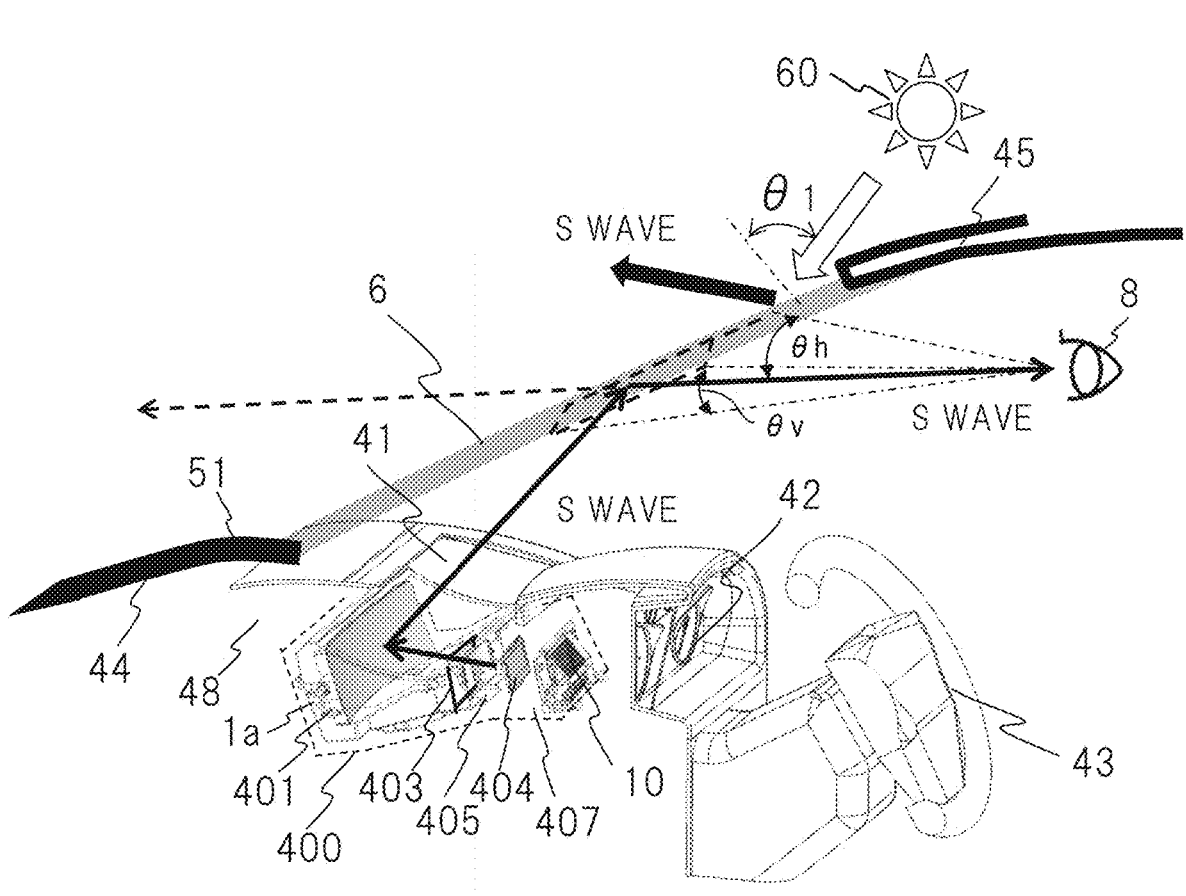
FIG. 22 is a diagram showing a main part configuration when a related-art (comparative example) HUD is installed in an automobile.

Furthermore, it is further preferred that the reflection mirror 2120 has the property of reflecting ultraviolet ray and light having a wavelength of 800 nm or more contributing to temperature increase among spectral irradiant energy of sunlight shown in FIG. 21. In addition, also in this embodiment, as similar to the embodiment shown in FIG. 1, the forming position of the air floating video 220 can be vertically moved by employing a structure that enables the retroreflection optical member 2100 to be moved vertically in the drawing. Consequently, the depression angle of the air floating video 220 as viewed at the eye point 8 of the driver changes, and therefore, the video display distance and size of the air floating video 220 can be virtually changed relative to the actual scenery visually recognized by the driver. Furthermore, also similar to this embodiment, a camera (not illustrated) for sensing the line of sight of the driver may be arranged to track the line of sight of the driver to move the display position of the air floating video 220 in cooperation with the line-of-sight position. In addition, the video image displayed as the air floating video 220 at this time may be used as alert information or the like matched with the actual scenery viewed by the driver to cause attention during driving. In addition, if the example shown in FIG. 3 has a structure excluding the reflection mirror 2120 arranged at the final position of the light path of the apparatus, a part of or entire video light can be transmitted through the windshield 6, and can cause display of the air floating video 60 on the inner surface of the windshield 6 or at a position above the windshield 6 outside the vehicle.

Second Embodiment of Air Floating Video Display Apparatus

Figure 4:
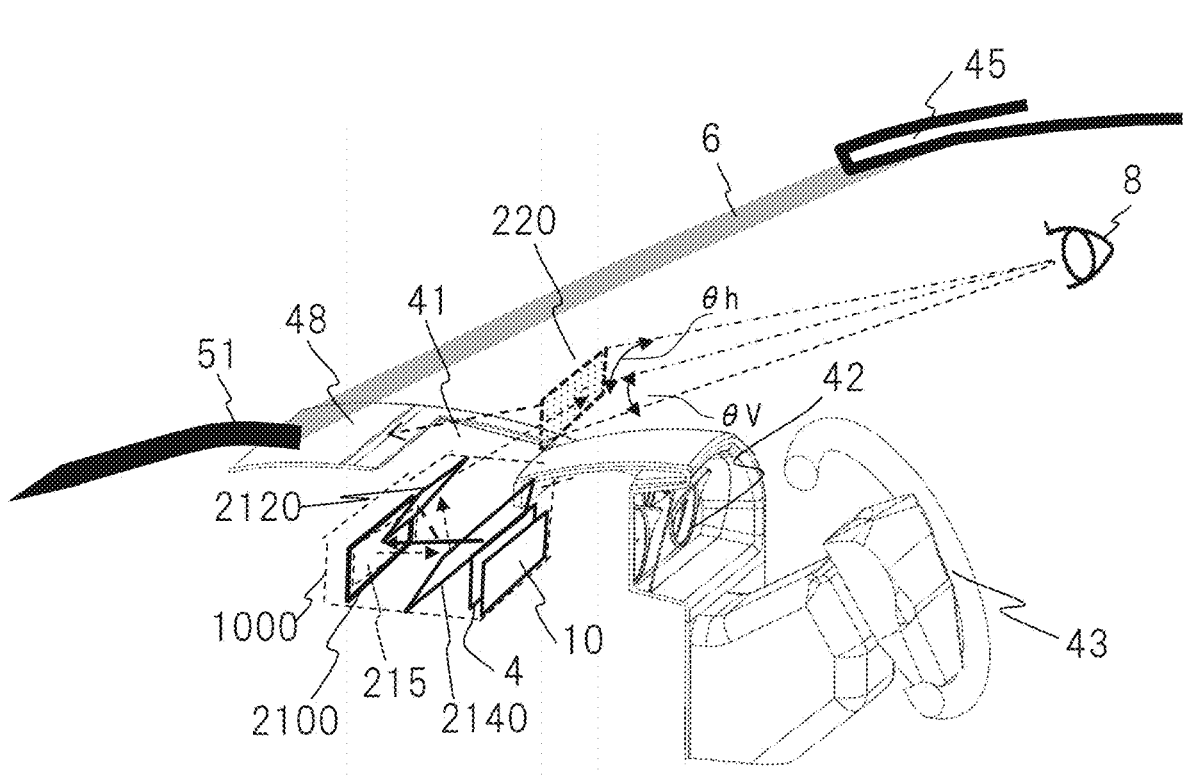
FIG. 4 is a diagram showing a second embodiment of a main part configuration when the air floating video display apparatus is installed in an automobile.

With reference to FIG. 4, a second embodiment of the air floating video display apparatus for in-vehicle use of the invention of the present application will be described below. As similar to the first embodiment, a liquid crystal display panel configured to modulate light supplied from a light source 10 in accordance with a video signal and emit the light as light of a specific polarization wave is used as a video display apparatus 4 in the second embodiment. A video image of a specific polarization wave (here S-polarization wave) modulated by this liquid crystal display panel is transmitted through a beam splitter or reflection-type light polarizer 2140 configured to transmit S-polarization light but reflect P-polarization light, is reflected by the retroreflection optical member 2100, and forms the air floating video 220. A λ/4 waveplate 15 is arranged on a video light entering surface of the retroreflection optical member 2100. The S-polarization video light is converted to the P-polarization light when being transmitted through the λ/4 waveplate 215 twice by entering and then being reflected by the retroreflection optical member 2100. The P-polarization video light is reflected by the beam splitter or reflection-type light polarizer 2140, and is reflected by a reflection mirror 2120 arranged on the upper side, and is emitted through an opening portion 41 arranged in the dashboard 48. In this manner, the air floating video 220 can be formed at a predetermined position. An image forming position of the resultant air floating video is formed on a line segment connecting the reflection mirror 2120 and the line of sight, and the video image can be overlaid as an actual image on an actual scenery observed by the driver during driving as similar to the related-art HUD when the video image is formed on the upper side of the mirror's upper end. At this time, the window glass is not used as the optical system as different from the related-art HUD, and therefore, the air floating video display apparatus is unsusceptible to variations in the curvature radius and/or inclination of the window glass due to the automobile design, and is excellent in applicability to different automobile models.

As the reflection mirror 2120, a reflection mirror similar to one in the first embodiment can be used. The reflection mirror 2120 selectively reflects this P-polarization component having entered the vehicle as described above (FIG. 20). Therefore, no external light enters optical components. Thus, the reliability of the optical components, the video display apparatus 4 and/or the like is not degraded. Furthermore, it is further preferred that the property of the reflection mirror 2120 be a property similar to that in the first embodiment (FIG. 21). In addition, as similar to the embodiment shown in FIG. 1, the retroreflection optical member 2100 is configured to be movable vertically in the drawing. In the manner, the forming position of the air floating video 220 can be vertically moved. Consequently, the depression angle of the air floating video 220 as viewed at the eye point 8 of the driver changes, and therefore, the video display distance and size of the air floating video 220 can be virtually changed relative to the actual scenery visually recognized by the driver.

According to the embodiments described above, high-resolution video can be displayed as the air floating video 220 as viewed to be aerially floating on, for example, an extension of the opening portion 41 on the dashboard 48 (for example, on the path of light reflected by the reflection mirror 2120). At this time, the embodiment is configured so that the video light emitted through the opening portion 41 of the air floating video display apparatus 1000 has a small divergence angle, namely acute angle, and besides, has the unified specific polarization wave. Thus, only normal reflected light can be efficiently reflected for the retroreflection optical member 2100. Therefore, according to the embodiment, the light use efficiency is high, the ghost image that is generated in addition to the main air floating video, the ghost image being the problem in the related art retroreflection method, can be suppressed, and a clear air floating video can be provided. In addition, a configuration including a light source (the light source 10) of the present embodiment can provide a novel air floating video display apparatus capable of significantly reducing power consumption and having excellent applicability. In addition, as described above, this can provide an in-vehicle air floating video display apparatus capable of displaying so-called unidirectional air floating video that can be visually recognized inside or outside the vehicle via the windshield 6 of the vehicle.

Figure 5:
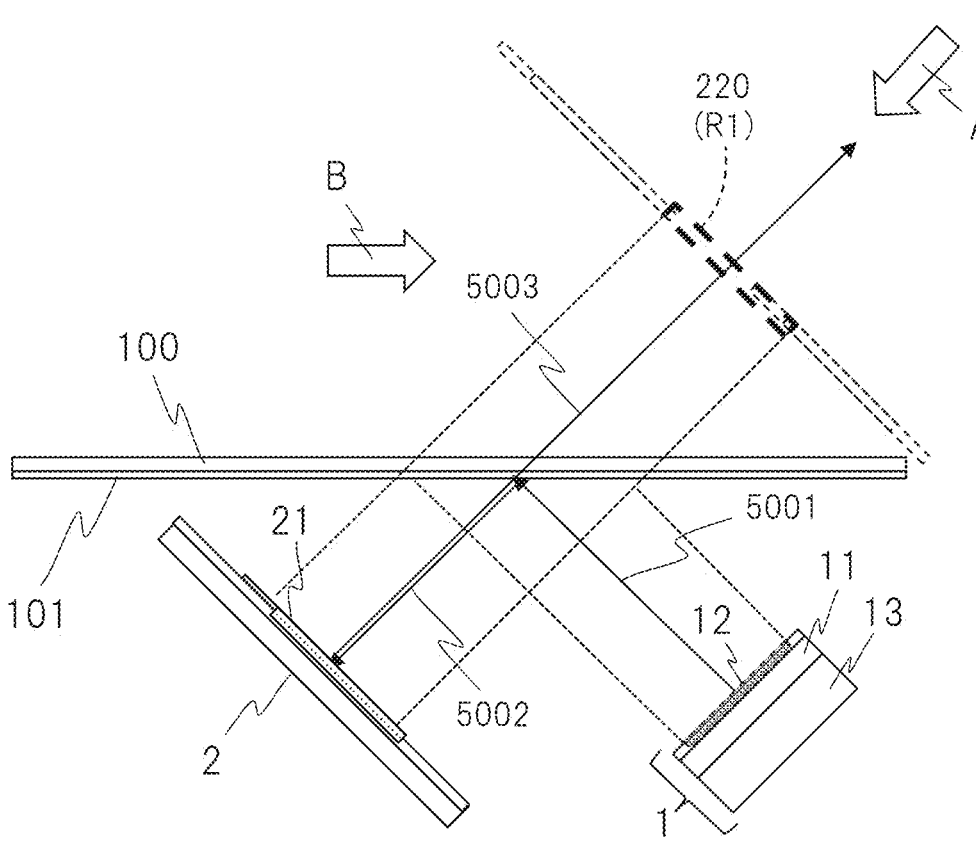
FIG. 5 is a diagram showing an example of a main part configuration and an example of a retroreflection optical portion configuration for explaining a principle of an air floating video display apparatus according to an embodiment of the present invention.
Figure 5:
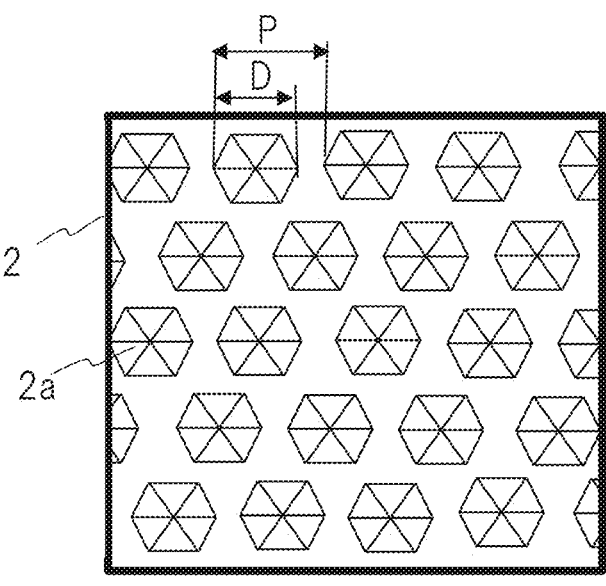

With reference to FIG. 5, the configuration of the air floating video display apparatus according to the present embodiment will be more specifically described. As shown in FIG. 5(A), a display apparatus 1 configured to diffuse video light of a specific polarization wave at a narrow angle is arranged in a direction oblique to a transparent member 100 such as glass (as shown in the drawing, a predetermined direction having such an angle as to be oblique to a direction of a plane of the transparent member 100 and to a direction perpendicular thereto, that is a direction of an optical axis 5001). The display apparatus 1 includes a liquid crystal display panel 11 that is a video source configured to emit the video light, and a light source (namely a backlight) 13 configured to produce the light of the specific polarization wave having the narrow-angle diffusion property.

The video light of the specific polarization wave emitted from the display apparatus 1 is reflected by a polarization splitter 101 having a film arranged on the transparent member 100 and configured to selectively reflect the video light of the specific polarization wave, and the reflected light enters a retroreflection optical member 2 in a direction of an optical axis 5002. In the drawing, the polarization splitter 101 is formed in a sheet shape, and is bonded to a surface of the transparent member 100. A λ/4 waveplate 21 is arranged on a video-light entering surface of the retroreflection optical member 2. The specific polarization of the video light is converted to the other polarization wave when being transmitted through the λ/4 waveplate 21 twice that are entering to and emission out from the retroreflection optical member 2. Here, the polarization splitter 101 configured to selectively reflect the video light of the specific polarization wave has a property that transmits light of the polarization-converted other polarization wave. Therefore, in the direction of the optical axis 5002, the polarization-converted video light of the specific polarization wave is transmitted through the polarization splitter 101. The video light having been transmitted through the polarization splitter 101 forms an air floating video 220 that is an actual image at a predetermined position outside the transparent member 100 in the direction of an optical axis 5003.

Note that the light forming the air floating video 220 is aggregation of light rays converging from the retroreflection optical member 2 to an optical image of the air floating video 220. These light rays propagate straight even after being transmitted through the optical image of the air floating video 220. Therefore, the air floating video 220 is a video having high directionality as different from the diffused video light formed on a screen by a general projector or the like. Therefore, in the configuration of FIG. 5, the air floating video 220 is visually recognized as a suitable bright video when being visually recognized by the user U (the corresponding eyepoint) in a direction of the arrow A corresponding to a direction of the video light having the high directionality. On the other hand, the air floating video 3 cannot be visually recognized as a video at all when being visually recognized by a different person in a direction different from the direction of the arrow A. The property of the high directionality is very preferable when being applied to a system displaying the video information that is necessary only for the driver (a user at a position of an eye point corresponding to the direction A), a system displaying having high confidentiality that needs to be confidential to a different person who is outside the vehicle and who faces the driver (a person who has an eye point corresponding to the direction B) or a person at a different position inside the vehicle, and/or the like.

Note that light polarization axes of the video light after the reflection are sometimes ununified depending on a performance of the retroreflection optical member 2. In this case, a part of the video light having the ununified light polarization axes is reflected by the polarization splitter 101, and returns to the display apparatus 1. This light is reflected again by a video display surface of the liquid crystal display panel 11 configuring the display apparatus 1, and forms the ghost image as described above, and therefore, may reduce the video quality of the air floating video 220. Accordingly, in the present embodiment, the video display surface of the display apparatus 1 is provided with an absorbance-type light polarizer 12. The video light emitted from the display apparatus 1 is transmitted through the absorbance-type light polarizer 12, and the reflection light returning from the polarization splitter 101 is absorbed by the absorbance-type light polarizer 12. In the manner, the absorbance-type light polarizer 12 can suppress the re-reflection, and can prevent the reduction of the video quality of the air floating video 220 due to the ghost image.

To the polarization splitter 101, a member made of, for example, a reflection-type light polarizer, a metal multilayer film that reflects the specific polarization wave or the like may be applied.

Next, FIG. 5(B) shows a surface shape of a retroreflection optical member produced by Nippon Carbide Industries Co., Inc., used as the typical retroreflection optical member 2 for this study. This retroreflection optical member has an in-plane orderly-aligned hexagonal prism. The light ray entering the orderly-aligned hexagonal prism is reflected on a wall surface and a bottom surface of the hexagonal prism, is emitted as the retroreflection light in a direction corresponding to the incident light, and forms a normal video R1 (that is an image formed at a predetermined position) of the air floating video 220 shown in FIG. 5(A). The retroreflection optical member also achieves a similar effect when the hexagonal prism in the drawing is configured so that a reflection surface is so arranged on a bottom surface as to be a surface in contact with air, a hexagonal corner surface is formed above the reflection surface, and a hexahedron and the hexagonal prism are hollow while the rest is filled with resin.

On the other hand, as shown in FIG. 6, the ghost image different from the normal video R1 is formed in accordance with the video light having obliquely entered the retroreflection optical member among the video light emitted from the display apparatus 1. The air floating video display apparatus of the present invention displays the air floating video that is the actual image based on the video displayed on the video display apparatus 1. Resolution of this air floating video significantly depends on not only the resolution of the liquid crystal display panel 11 but also a diameter "D" and a pitch "P" of the retroreflection optical member 2 (hexagonal prism) shown in FIG. 5(B). For example, when a WUXGA liquid crystal display panel of 7 inches (1920× 1200 pixels) is used, even if one pixel (corresponding one triplet) is about 80 μm, if the diameter D and the pitch P of the retroreflection optical member 2 (hexagonal prism) are 240 μm and 300 μm, respectively, one pixel of the air floating video is equivalent to 300 μm. Therefore, effective resolution of the air floating video decreases down to about ⅓.

Accordingly, in order to make the resolution of the air floating video equal to the resolution of the display apparatus 1, it is desirable to make the diameter D and the pitch P of the retroreflection optical member 2 (hexagonal prism) close to one pixel of the liquid crystal display panel 11. Meanwhile, in order to suppress the moire based on the pixels of the liquid crystal display panel 11 and the retroreflection optical member 2, each pitch ratio may be designed to deviate from an integral multiple of one pixel. Regarding the shape, all sides of the retroreflection optical member 2 may be arranged not to overlap all sides of one pixel of the liquid crystal display panel 11.

Furthermore, as shown in FIG. 6, when external light 6000 enters the retroreflection optical member 2 in an oblique direction, the external light 6000 is reflected on the surface of the retroreflection optical member 2 (hexagonal prisms 2a, 2b, 2c, and the like), forms the ghost images in various directions, and therefore, significantly reduce the video quality of the air floating video. Through experiment, the present inventors have found a relation between a blur "l" and a pixel size "L" of an acceptable air floating video in order to improve the video quality and the visual recognition of the air floating video. At that time, the inventors have prepared a display apparatus 1 to find the relation by combining a liquid crystal display panel having a pixel pitch of 40 μm and a light source having a narrow divergence angle (for example, a divergence angle of 15°) property of the present embodiment.

It has been found that the blur amount 1 that deteriorates visual recognition is desired to be 40% or less of the pixel size, and the blur is hardly observed if it is 15% or less. It has been found that, in the surface roughness of the reflection surface (a surface roughness 6010 of the retroreflection surface in FIG. 6) having the acceptable blur amount 1 at that time, an average roughness is 160 nm or less within a measurement distance of 40 μm, and the surface roughness of the reflection surface is desired to be 120 nm or less in order to achieve the hardly-observed blur amount 1. Therefore, it is desired to reduce the surface roughness of the retroreflection optical member described above, and desired to provide the surface roughness including the reflection film forming the reflection surface and its protection film to have the above-described value or less.

Meanwhile, in order to manufacture the retroreflection optical member at a low cost, the retroreflection optical member may be shaped by a roll press method. Specifically, this method is a method of arranging and forming the retroreflection portion (hexagonal prism in FIG. 6) on a film. This method forms a necessary shape by forming an inverse shape of the shape to be formed on a roll surface, applying an ultraviolet curing resin onto a base material for fixation, and causing the portion to be transmitted through a gap between the rolls, and then, hardens the shape by emitting the ultraviolet ray thereto, and this manner provides the retroreflection optical member 2 having a desirable shape.

The display apparatus 1 of the present embodiment shown in FIG. 5 is made of the liquid crystal display panel 11 and the light source 13 generating the light of the specific polarization wave having the narrow-angle diffuse property described later. Therefore, a possibility of the oblique entering (FIG. 6) of the video light into the retroreflection optical member 2 is made small. This provides an apparatus that is excellent in a structure in which a luminance of the ghost video is low even if the ghost image is generated.

Third Embodiment of Air Floating Video Display Apparatus

Figures 8, 9:
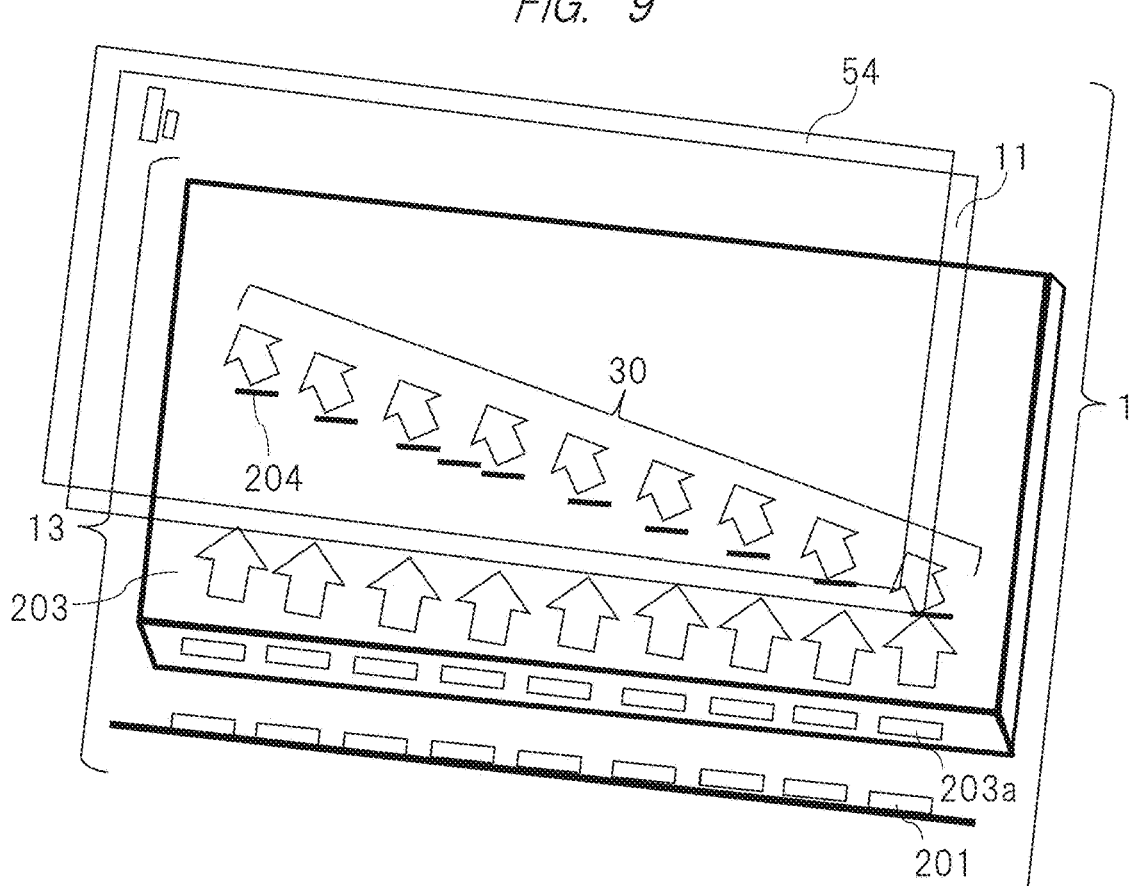
FIG. 8 is a diagram showing another embodiment of a main part configuration of an air floating video display apparatus according to an embodiment of the present invention.
FIG. 9 is a configuration diagram showing a configuration of a display apparatus according to an embodiment.

FIG. 8 shows another example of a main part configuration of an air floating video display apparatus according to an embodiment of the present invention. A display apparatus 1 is made of a liquid crystal display panel 11 as a video display element, and a light source 13 configured to produce light of a specific polarization wave having a narrow-angle diffusion property. The liquid crystal display panel 11 is made of a liquid crystal display panel selected from a range from a small-sized one having a screen size of about 3 inches to a large-sized one having a screen size of over 80 inches. If the video light emitted from the liquid crystal display panel 11 is, for example, P-polarization light, the video light is transmitted through a polarization splitter 101 configured to transmit P-polarization light, and is directed to a retroreflection optical member 2. A λ/4 waveplate 21 is arranged on a light entering surface of the retroreflection optical member 2, and the specific polarization wave (P-polarization wave) is converted to the other polarization wave (S-polarization wave) by the polarization conversion causing the video light to be transmitted therethrough twice. Light of the other polarization wave (S-polarization wave) is reflected by the polarization splitter 101, and displays a stereoscopic image 3 that is an actual image as shown with a dashed line if a reflection mirror 300 is arranged outside a transparent member 100. The P-polarization wave is illustrated with a dashed line, and the S-polarization wave is illustrated with a solid line.

In addition, the reflection mirror 300 is configured to be turnable. By turning the reflection mirror 300, the orientation and position of this stereoscopic image 3 can be adjusted.

In addition, in a mode without the reflection mirror 300, a planar image 3b of the actual image is displayed in a direction perpendicular to the drawing (a direction of the plane of the transparent member 100).

In addition, the polarization splitter 101 is configured to be turnable. By turning the polarization splitter 101, the orientation and position of the planar video 3b can be adjusted.

An external-light entering window of the transparent member 100 is provided with an absorption-type light polarizer 12. By this absorption-type light polarizer 12, an external light component of the P wave and/or illumination light are absorbed. When the retroreflection optical member 2 retroreflects the video light, the light polarization axes of a part of the video light are occasionally not unified. The video light in this case is transmitted through the polarization splitter 101, and returns to the display apparatus 1. This light component is reflected again by the video display surface of the liquid crystal display panel 11 configuring the display apparatus 1, forms the ghost image, and significantly reduces the video quality of the air floating video. Accordingly, in the present embodiment, the video display surface of the display apparatus 1 is provided with the absorption-type light polarizer 12. When the video light having returned to the display apparatus 1 is absorbed by the absorption-type light polarizer 12, the reduction of the video quality of the air floating video due to the ghost image is prevented.

Furthermore, if the external light enters the retroreflection optical member 2, a strong ghost image may occur. Therefore, this embodiment is configured so that entering of external light is prevented by a light block member 25 arranged on an inner surface of the transparent member 100 outside the absorption-type light polarizer 12 of the external-light entering window. The polarization splitter 101 may be made of, for example, a reflection-type light polarizer or a metal multilayer film that reflects the specific polarization wave.

In addition, a light block member (not illustrated) used for blocking the oblique video light other than the normal video light forming the air floating video may be simultaneously arranged between the polarization splitter 101 and the liquid crystal display panel 11. Also, a light block member (not illustrated) used for blocking the oblique video light other than the normal video light may be simultaneously arranged between the polarization splitter 101 and the retroreflection optical member 2. Further, the light block member 25 is simultaneously arranged in order to prevent the external light from directly entering the retroreflection optical member 2 as described above, to block the oblique light generating the ghost image. The present inventors have verified by experiment that this results in suppression of occurrence of the ghost image.

<Reflection-Type Light Polarizer>

In a reflection-type light polarizer having a grid structure in the present embodiment, the property for the light in the direction vertical to the light polarization axis decreases. Therefore, specifications along the light polarization axis are desirable, and the light source (light source 13) of the present embodiment capable of emitting the video light at the narrow angle, the light having been emitted from the liquid crystal display panel 11, is an ideal light source. For the oblique light, the property in the horizontal direction similarly decreases. In consideration of the above-described properties, a configurational example of the present embodiment using the light source capable of emitting the video light at the narrow angle, the light having been emitted from the liquid crystal display panel 11, as a backlight of the liquid crystal display panel, will be explained below. In this manner, the high-contrast air floating video can be provided.

<Display Apparatus>

Next, the display apparatus 1 of the present embodiment will be explained with reference to drawings. The display apparatus 1 of the present embodiment includes the video display component (liquid crystal display panel) 11 and the light source 13 configuring its light source. FIG. 9 shows the light source 13 together with the video display component (liquid crystal display panel) 11 in an exploded transparent view.

As illustrated with an arrow (emitted luminous flux) 30 in FIG. 9, from the light emitted from the light source 13 that is the backlight apparatus, this video display component (liquid crystal display panel) 11 provides the illumination luminous flux having the property similar to the laser beam having the narrow-angle diffuse property meaning the intense directionality (rectilinear propagation) and having the unidirectionally-unified light polarization surface, and emits the video light modulated in accordance with the input video signal. Then, the video light is reflected by the retroreflection optical member 2 and is transmitted through the window glass, and forms the air floating video that is the actual image (see FIG. 1). The display apparatus 1 of the present embodiment in FIG. 9 is configured to include the liquid crystal display panel 11 configuring the display apparatus 1, a light-direction converting panel 54 for controlling the directionality of the luminous flux emitted from the light source 13, and a narrow-angle diffuse plate (not illustrated) as necessary. In other words, the light polarizer is arranged on both surfaces of the liquid crystal display panel 11 to adjust the light intensity of the video light of the specific polarization wave in accordance with the video signal, and the light is emitted (see the arrow (luminous flux) 30 in FIG. 9). In this manner, in the display apparatus 1 of the present embodiment, a desirable video is projected as the light of the specific polarization wave having the high directionality (rectilinear propagation) to the retroreflection optical member 2 through the light-direction converting panel 54, and is reflected by the retroreflection optical member 2, and then, is transmitted toward eyes of the viewing person inside/outside the vehicle (space), and forms the air floating video. Note that a protection cover may be arranged on a surface of the light-direction converting panel 54.

In the present embodiment, in order to improve the use efficiency of the luminous flux 30 emitted from the light source 13 to significantly reduce the power consumption, the display apparatus 1 configured to include the light source 13 and the liquid crystal display panel 11 can be configured as follows. Specifically, in the display apparatus 1, the light (see the arrow (emitted luminous flux) 30 in FIG. 9) emitted from the light source 13 can be projected toward the retroreflection optical member 2, and can be reflected by the retroreflection optical member 2, and then, the directionality can be controlled to form the floating video at the desirable position by using a transparent sheet (not illustrated) arranged on the surface of the window glass. Specifically, in this transparent sheet, the image forming position of the air floating video is controlled with the high directionality by an optical component such as a Fresnel lens and a linear Fresnel lens. In this manner, the video light emitted from the display apparatus 1 and having the high directionality (rectilinear propagation) such as laser beam efficiently reaches the viewing person outside the window glass (such as on the sidewalk). As a result, the high-quality air floating video with the high resolution can be displayed, and the power consumption of the display apparatus 1 including the LED (Light Emitting Diode) element 201 of the light source 13 can be significantly reduced.

First Embodiment of Display Apparatus

Figures 10, 11:
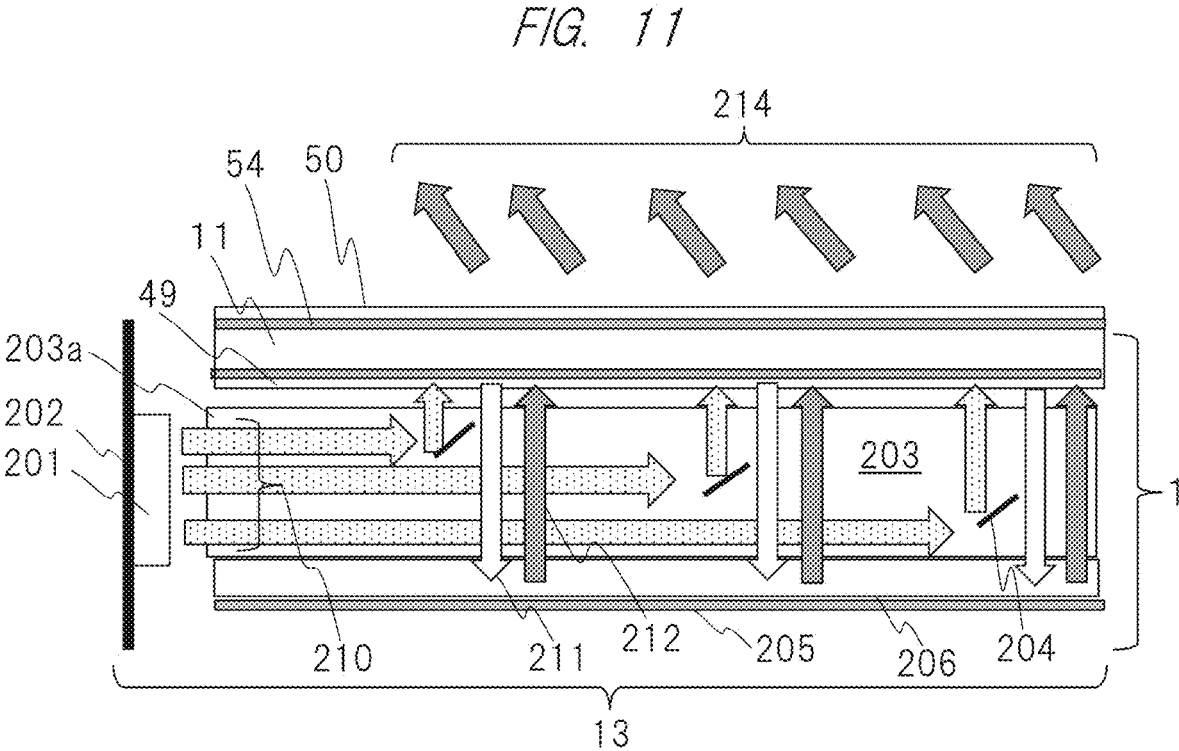
FIG. 10 is a cross-sectional view showing an example of a specific configuration of a light source.
FIG. 11 is a cross-sectional view showing an example of a specific configuration of a light source.

FIG. 9 shows an example of a specific configuration of the display apparatus 1. In FIG. 10, the liquid crystal display panel 11 and the light-direction converting panel 54 are arranged above the light source 13 of FIG. 9. This light source 13 made of, for example, plastic or others is configured to house the LED element 201 and a light guiding body 203 therein. As shown in FIG. 10 and others, in order to convert the divergence light emitted from each LED element 201 to be substantially collimated luminous flux, an end surface of the light guiding body 203 has a cross-sectional area gradually increasing toward a surface facing the light receiver to form a lens shape having a function of making the divergence angle gradually small through a plurality of total reflections in internal propagation. The liquid crystal display panel 11 configuring the display apparatus 1 is attached onto an upper surface of the light guiding body 203. The LED element 201 that is a semiconductor light source and an LED board 202 on which a control circuit for the LED element 201 is mounted may be attached to one side surface (in this example, a left end surface) of the case of the light source 13. Also, a heat sink that is a member for cooling the heat generated in the LED element 201 and the control circuit may be attached to an outer surface of the LED board 202.

To a frame (not illustrated) of the liquid crystal display panel 11 attached to an upper surface of the case of the light source 13, the liquid crystal display panel 11 attached to this frame, a FPC (Flexible Printed Circuits: flexible wiring board) (not illustrated) electrically connected to this liquid crystal display panel 11 and others are attached. In other words, the liquid crystal display panel 11 that is the liquid crystal display component generates the display video in corporation with the LED element 201 that is a solid light source by modulating an intensity of the transmission light on the basis of a control signal output from a control circuit (not illustrated) configuring the electronic device. In this case, the generated video light has the narrow diffuse angle, and is made of only the specific polarization wave component, and therefore, a novel video display apparatus that is approximately a surface emission laser video source driven based on the video signal and that is different from the related art can be provided. Currently, note that it is technically and safely impossible to provide a laser apparatus to form the laser luminous flux having the same size as that of the image provided by the display apparatus 1. Accordingly, in the present embodiment, the light that is approximately the surface emission laser video light is formed from the luminous flux emitted from, for example, a general light source including an LED element.

Subsequently, a configuration of the optical system housed in the case of the light source 13 will be explained in detail with reference to FIG. 11 in addition to FIG. 10. Since each of FIGS. 10 and 11 is a cross-sectional view, only one of a plurality of LED elements 201 configuring the light source is illustrated. Light from the plurality of LED elements 201 is converted to substantially collimated light by a shape of a light receiving end surface 203a of the light guiding body 203. Therefore, the light receiver and the LED element 201 on the end surface of the light guiding body 203 are attached so as to keep a predetermined positional relation. Note that each light guiding body 203 is made of, for example, a light-transmittable resin such as acrylic resin. The LED light receiving surface of the end of the light guiding body 203 has, for example, a conically convex outer circumferential surface formed by rotation of a paraboloid cross section, an apex of the outer circumferential surface has a concave portion with a convex portion (in other words, a convex lens surface) at center of the apex, and center of a plane portion of the light receiving end surface 203a of the light guiding body 203 has a convex lens surface that protrudes outward (or may be a concave lens surface that is recessed inward). Note that the outer shape of the light receiver of the light guiding body to which the LED element 201 is attached is the paraboloid shape forming the conically-shaped outer circumferential surface, and is set within a range of an angle allowing the light peripherally emitted from the LED element 201 to be totally reflected inside the outer circumferential surface, or forms the reflection surface.

Meanwhile, the LED element 201 is arranged at each of predetermined positions on the surface of the LED board 202 that is its circuit board. The LED board 202 is arranged and fixed so that each LED element 201 on its surface is positioned at center of the concave portion to correspond to the light receiving end surface 203a as the LED collimator.

In such a configuration, the light emitted from the LED element 201 can be extracted to be the substantially collimated light by the shape of the light receiving end surface 203a of the light guiding body 203, and the use efficiency of the generated light can be improved.

As described above, the light source 13 in FIG. 9 or the like is configured so that the light source unit including the plurality of LED elements 201 that are the light sources are attached to the light receiving end surface 203a that is the light receiver on the end surface of the light guiding body 203. In the manner, the divergence luminous flux emitted from the LED elements 201 is formed to be the substantially collimated light by the lens shape of the light receiving end surface 203a on the end surface of the light guiding body 203, is guided to propagate in the light guiding body 203 as illustrated with an arrow (a direction in parallel to the drawing sheet), and is emitted toward the liquid crystal display panel 11 (in a frontward direction perpendicular to the drawing sheet) arranged in substantially parallel to the light guiding body 203 by a luminous-flux direction converting means 204. When the distribution (in other words, density) of the luminous-flux direction converting means 204 is optimized by a shape of the inside or the surface of the light guiding body 203, the unification of the luminous flux entering the liquid crystal display panel 11 can be controlled. In the luminous-flux direction converting means 204, when the surface shape of the light guiding body 203 or the inside of the light guiding body is provided with, for example, portions having a different refractive index, the luminous flux propagating inside the light guiding body 203 is emitted toward the liquid crystal display panel 11 (in the frontward direction perpendicular to the drawing sheet) arranged in substantially parallel to the light guiding body 203. This case is practically acceptable if the relative luminance ratio is equal to or higher than 20% when the luminance is compared between the center of the screen and the peripheral portion of the screen in a state in which the liquid crystal display panel 11 normally faces the center of the screen while a point of view is arranged at the same position as that of a diagonal dimension of the screen, and the relative luminance ratio that is higher than 30% provides the further excellent property.

As similar to FIG. 10, note that FIG. 11 is a cross-sectional arrangement diagram for explaining the configuration of the light source (light source 13) in the present embodiment and its function that performs the light polarization conversion in the light source 13 including the light guiding body 203 and the LED element 201. In FIG. 11, the light source 13 includes the light guiding body 203 including the luminous-flux direction converting means 204 being made of, for example, plastic or others on its surface or inside, the LED element 201 functioning as the light source, the reflection sheet 205, the waveplate 206, the lenticular lens and others. The liquid crystal display panel 11 including the light polarizer on the light-source light entering surface and the video-light emitting surface is attached as the video display element to the upper surface of the light source.

The display apparatus 1 may have the following configuration. In FIG. 10, the light-source light entering surface (the lower surface in the drawing) of the liquid crystal display panel 11 corresponding to the light source 13 is provided with a film-form or sheet-form reflection-type light polarizer 49. The light source 13 selectively reflects one polarization wave (such as P wave) of the natural luminous flux 210 emitted from the LED element 201 to reflect it by the reflection sheet 205 on one surface (the lower side in the drawing) of the light guiding body 203, and guides it toward the liquid crystal display panel 11 again. Accordingly, the $\lambda/4$ waveplate that is the waveplate is arranged between the reflection sheet 205 and the light guiding body 203 or between the light guiding body 203 and the reflection-type light polarizer 49. In this configuration, the luminous flux is converted from the P-polarization light to the S-polarization light when being reflected by the reflection sheet 205, and then, being transmitted through the $\lambda/4$ waveplate twice, and the use efficiency of the light-source light functioning as the video light is improved. The video luminous flux (shown with an arrow 213 in FIG. 10), the light intensity of which has been modulated in the liquid crystal display panel 11 in accordance with the video signal, enters a retroreflection optical member 2100 as shown in FIG. 1, is reflected, and then, is travelled in a reflection mirror 2110 and a reflection mirror 2120, and forms the air floating video that is the actual image in the space inside or outside the vehicle.

The display apparatus 1 may have the following configuration. In FIG. 11, the light-source light entering surface (the lower surface in the drawing) of the liquid crystal display panel 11 corresponding to the light source 13 is provided with a film-form or sheet-form reflection-type light polarizer 49. The light source 13 selectively reflects one polarization wave (such as S wave) of the natural luminous flux 210 emitted from the LED element 201 to reflect it by the reflection sheet 205 on one surface (the lower side in the drawing) of the light guiding body 203, and guides it toward the liquid crystal display panel 11 again. The $\lambda/4$ waveplate that is the waveplate is arranged between the reflection sheet 205 and the light guiding body 203 or between the light guiding body 203 and the reflection-type light polarizer 49. In this configuration, the luminous flux is converted from the S-polarization light to the P-polarization light when being reflected by the reflection sheet 205, and then, being transmitted through the $\lambda/4$ waveplate twice, and the use efficiency of the light-source light functioning as the video light is improved. The video luminous flux (shown with an arrow 214 in FIG. 11), the light intensity of which has been modulated in the liquid crystal display panel 11 in accordance with the video signal, enters a retroreflection optical member 2100 as shown in FIG. 1, is reflected, and then, is travelled in the reflection mirror 2110 and the reflection mirror 2120, and forms the air floating video that is the actual image in the space inside or outside the vehicle.

In the light source 13 shown in FIGS. 10 and 11, since the one polarization wave component is reflected by the reflection-type light polarizer in addition to the function of the light polarizer arranged on the light entering surface of the corresponding liquid crystal display panel 11, a theoretical contrast ratio is calculated from multiplication of an inverse number of a cross transmittance of the reflection-type light polarizer and a cross transmittance caused by the two light polarizers attached to the liquid crystal display panel. Therefore, the high contrast performance is provided. Practically, from experiments, it has been verified that the contrast performance of the display video is improved to be ten or more times. As a result, the video with the high quality being equivalent to that of a self-luminous-type organic EL is provided.

Second Embodiment of Display Apparatus

Figure 12:
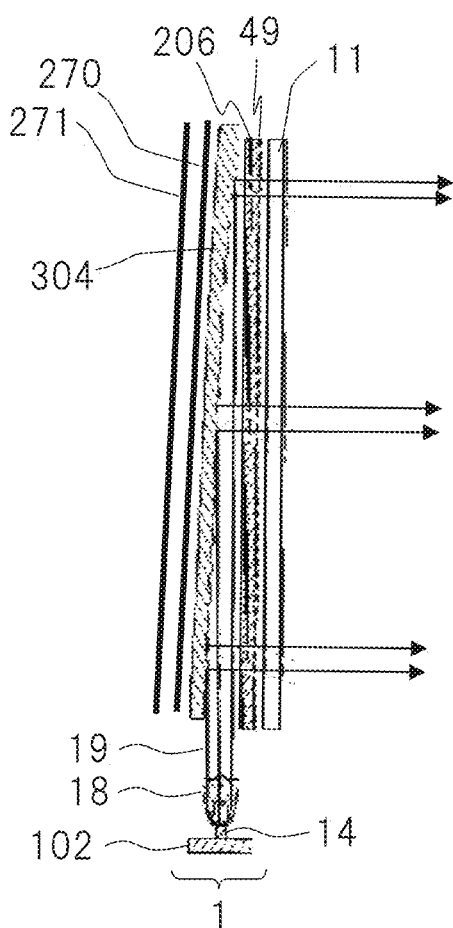
FIG. 12 is a cross-sectional view showing an example of a specific configuration of a light source.

Subsequently, another example of the specific configuration of the display apparatus 1 will be explained with reference to FIG. 12. In a light source of this display apparatus 1, the divergence luminous flux of the natural light (that is mixture of the P-polarization light and the S-polarization light) emitted from the LED 14 is converted to the substantially collimated light (in an up-and-down direction in the drawing) by a LED collimator 18, and is reflected toward the liquid crystal display panel 11 (in a right-and-left direction in the drawing) by the reflection-type light guiding body 304. The light reflected by this reflection-type light guiding body 304 enters a reflection-type light polarizer 49 and a waveplate 206 arranged between the liquid crystal display panel 11 and the reflection-type light guiding body 304. A specific polarization wave (for example S-polarization wave) is reflected by the reflection-type light polarizer 49, is converted in terms of phase by the waveplate 206, returns to a reflection surface of the reflection-type light guiding body 304 and is reflected by it, and is transmitted through the waveplate 206 again, and therefore, is converted into a polarization wave (for example P-polarization wave) to be transmitted through the reflection-type light polarizer 49.

As a result, the natural light emitted from the LED 14 is unified to have the specific polarization wave (such as the P-polarization wave), enters the liquid crystal display panel 11, is modulated in terms of luminance in accordance with the video signal, and is displayed as a video on the panel surface. As similar to the above-described example, a plurality of LEDs 14 configuring the light source are illustrated in FIG. 12 (however, only one LED is illustrated in FIG. 12 because the drawing is a vertical cross-sectional view), and these LEDs 14 are attached at predetermined positions to correspond to the LED collimator 18. Note that each LED collimator 18 is made of, for example, a light-transmittable resin such as acrylic resin or glass. And, as similar to the above-described embodiments, the LED collimator 18 has, for example, a conically convex outer circumferential surface formed by rotation of a paraboloid cross section, and an apex of the outer circumferential surface has a concave portion with a convex portion (in other words, a convex lens surface) at center of the apex. And, center of a plane portion of the LED collimator 18 has a convex lens surface that protrudes outward (or may be a concave lens surface that is recessed inward). Note that the paraboloid surface forming the conically-shaped outer circumferential surface of the LED collimator 18 is set within a range of an angle allowing the light peripherally emitted from the LED element 14 to be totally reflected inside the outer circumferential surface, or forms the reflection surface.

Figure 18:
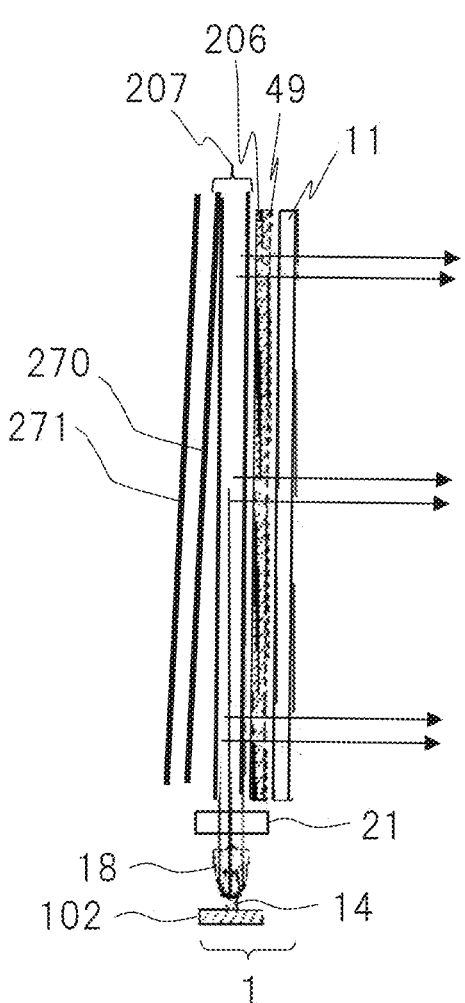
FIG. 18 is a cross-sectional view showing an example of a specific configuration of a light source.

The above-described configuration is the same configuration as that of the light source of the display apparatus 1 shown in FIG. 18. Further, the light having been converted to the substantially collimated light by the LED collimator 18 shown in FIG. 18 is reflected by the reflection-type light guiding body 304. By the function of the reflection-type light polarizer 49, the specific polarization light of this light is transmitted while other polarization light having been reflected is transmitted through the light guiding body 304 again and is reflected by a reflection plate 271 on another surface of the reflection-type light guiding body 304, the surface not being in contact with the liquid crystal display panel 11. In this case, this light is converted in terms of light polarization when being transmitted through the $\lambda/4$ waveplate 270 twice, the $\lambda/4$ waveplate 270 being the waveplate arranged between the reflection plate 271 and the liquid crystal display panel 11. The light is transmitted through the reflection-type light guiding body 304 again, is transmitted through the reflection-type light polarizer 49 arranged on the opposite surface, and enters the liquid crystal display panel 11 while having the unified polarization direction. As a result, in this configuration, all the light components of the light source can be used, and therefore, the use efficiency of the light is doubled.

Figure 16:
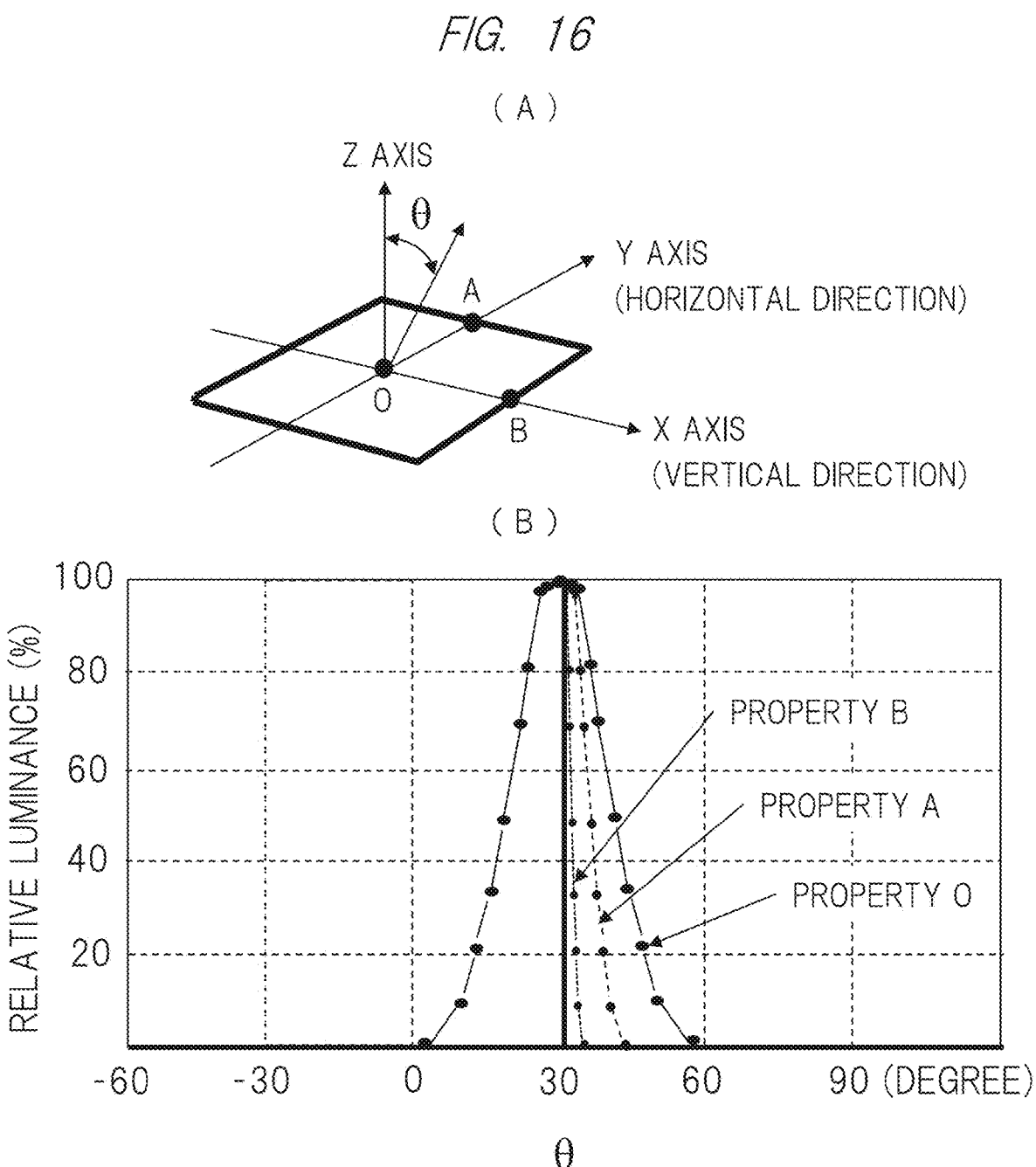
FIG. 16 is exemplary diagrams for explaining diffusion properties of a display apparatus.

In a related-art TV set, as shown in FIG. 16, the light emitted from the liquid crystal display panel has a diffuse property that is the same between a screen horizontal direction (illustrated on a Y axis in FIG. 16(A)) and a screen vertical direction (illustrated on an X axis in FIG. 16(A)). On the other hand, in the diffuse property of the luminous flux emitted from the liquid crystal display panel of the present embodiment, for example, when a viewing angle having a luminance that is 50% of a luminance of front view (angle of 0 degree) is 13 degrees as shown in the first example in FIG. 17, the viewing angle is about ⅕ of 62 degrees that is the related art. Similarly, in a case in which upper and lower viewing angles in the vertical direction are set to be unequal, a reflection angle of the reflection-type light guiding body 304, an area of the reflection surface and others are optimized so that the upper viewing angle is suppressed to be about ⅓ of the lower viewing angle. As a result, the video light quantity that propagates toward the viewing direction is significantly improved more than that of a related-art liquid crystal TV, and the luminance is equal to or higher than 50 times. Note that the X and Y directions in FIG. 17 are the same as those in FIG. 16(A).

Figure 17:
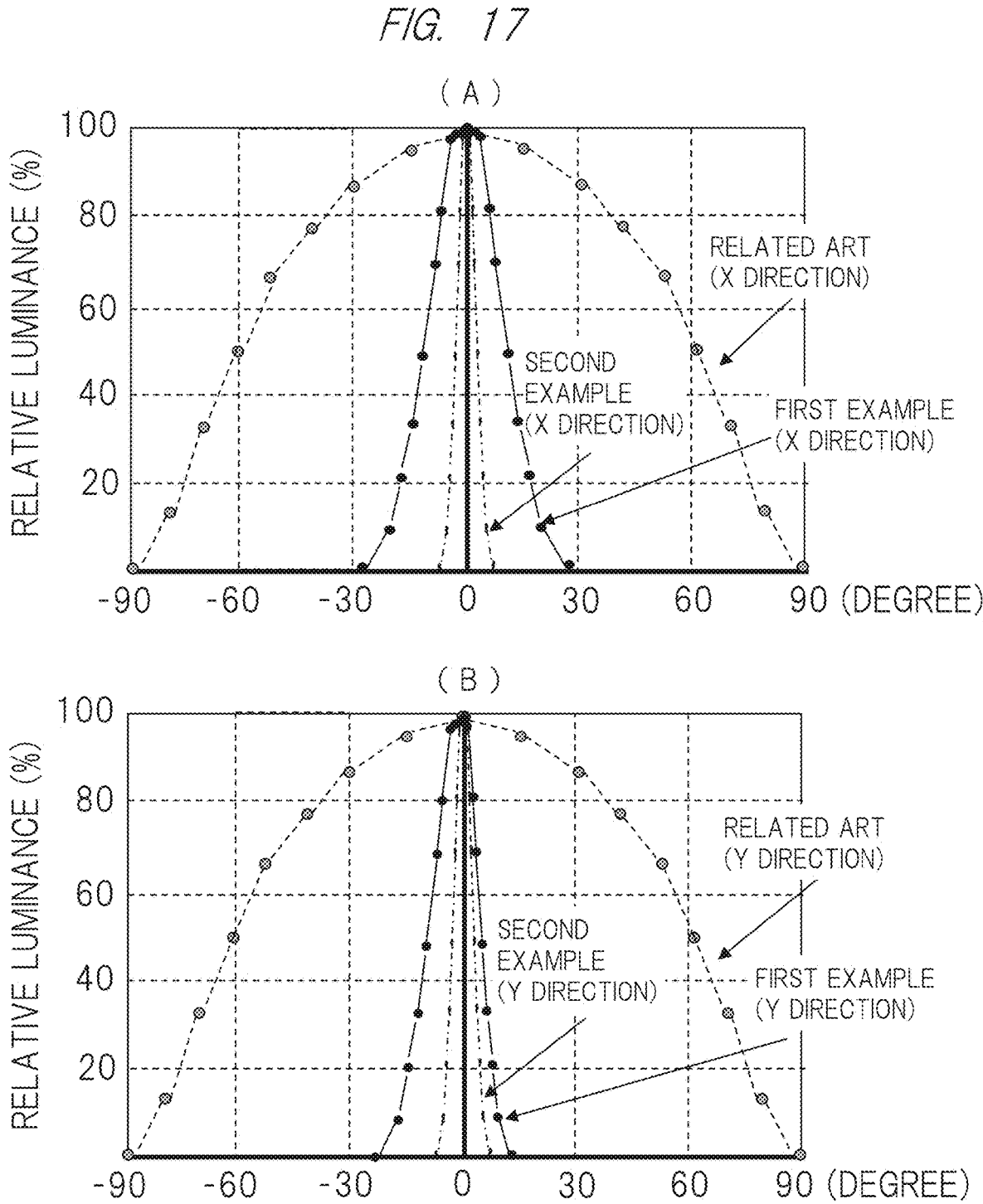
FIG. 17 is exemplary diagrams for explaining diffusion properties of a display apparatus.

Further, in the case of the viewing-angle property described in the second example of FIG. 17, when the viewing angle having the luminance of 50% of the luminance of the front view (angle of 0 degree) is 5 degrees, this is about 1/12 of 62 degrees that is the related art. Similarly, in a case in which upper and lower viewing angles in the vertical direction are set to be equal, a reflection angle of the reflection-type light guiding body 304, an area of the reflection surface and others are optimized so that the viewing angle is suppressed to be about 1/12 of that of the related art. As a result, in the present embodiment, the video light quantity is significantly improved more than that of the related-art liquid crystal TV, and the luminance is equal to or higher than 100 times.

When the viewing angle is set to the narrow angle as described above, the luminous flux quantity that propagates toward the viewing direction can be concentrated, and therefore, the light use efficiency is significantly improved. As a result, even in the use of the related-art liquid crystal display panel for TV, the significant improvement of the luminance can be achieved at the similar power consumption by the control of the light diffuse property of the light source, and the video display apparatus can be handled as a display apparatus for outdoor.

In a basic configuration of the embodiment, when the luminous flux having the narrow-angle directionality is caused to enter by the light source 10 as shown in FIGS. 3 and 4 and is modulated in terms of the luminance in accordance with the video signal, the air floating video 220 resulted from the reflection of the video information displayed on the screen of the liquid crystal display panel 4 by the retroreflection optical member 2100 is displayed inside or outside the room.

First Example of Light Source

Subsequently, a configuration of an optical system such as the light source housed in the case or others will be explained in detail with reference to FIGS. 14(a) and 14(b) in addition to FIG. 13.

Figure 13:
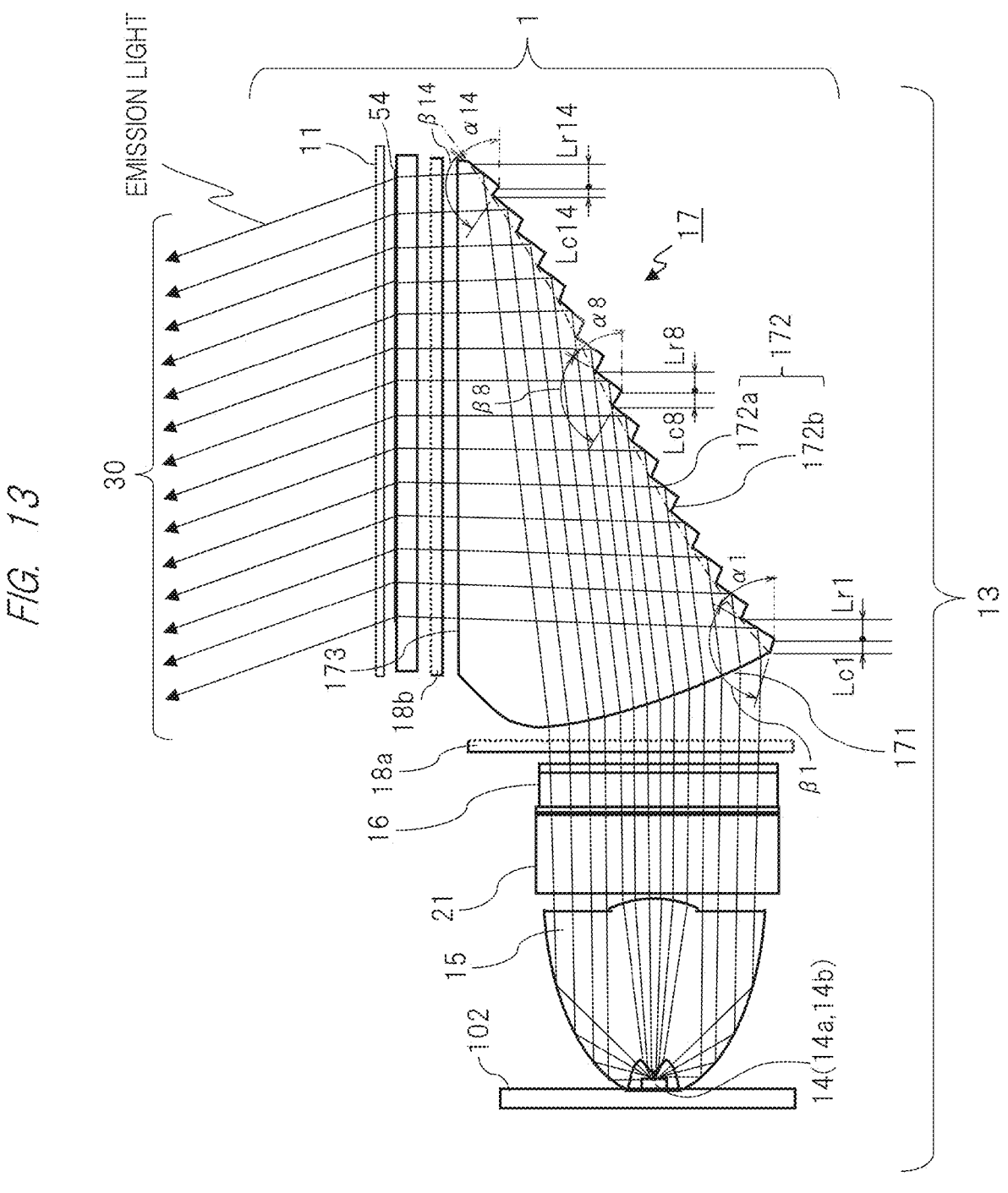
FIG. 13 is a cross-sectional view showing an example of a specific configuration of a light source.
Figure 14:
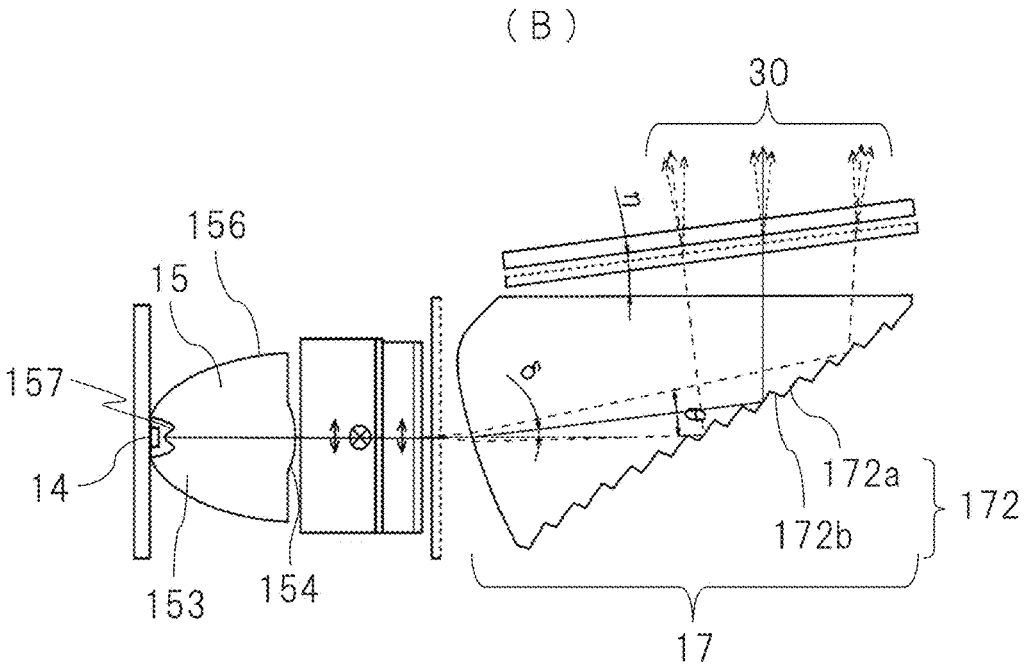
FIG. 14 is cross-sectional views showing an example of a specific configuration of a light source.

FIGS. 13 and 14 show the LEDs 14 (14a, 14b) configuring the light source, and are attached to predetermined positions of the LED collimator 15. Note that each LED collimator 15 is made of, for example, a light-transmittable resin such as acrylic resin. As shown in FIG. 14(b), the LED collimator 15 has a conically convex outer circumferential surface 156 formed by rotation of a paraboloid cross section, and an apex of the outer circumferential surface 156 has a concave portion 153 with a convex portion (in other words, a convex lens surface) 157 at center of the apex. And, center of a plane portion of the LED collimator 15 has a convex lens surface 154 that protrudes outward (or may be a concave lens surface that is recessed inward) Note that the paraboloid surface 156 forming the conically-shaped outer circumferential surface of the LED collimator 15 is set within a range of an angle allowing the light peripherally emitted from the LED element 14 (14a, 14b) to be totally reflected inside the outer circumferential surface, or forms the reflection surface.

The LEDs 14 (14a, 14b) are arranged at predetermined positions, respectively, on the surface of the LED board 102 that is its circuit board. The LED board 102 is arranged and fixed so that each of the LED elements 14a and 14b on the surface is positioned at center of the concave portion 153 of the LED collimator 15.

In such a configuration, among the light emitted from the LED element 14 (14a or 14b), particularly the light emitted upward (in the right direction in the drawing) from the center of the LED 14 is collected to form the substantially collimated light by the two convex lens surfaces 157 and 154 forming the outer shape of the LED collimator 15. The light peripherally emitted from other portions is reflected by the paraboloid surface 156 forming the conically-shaped outer circumferential surface of the LED collimator 15, and is similarly collected to form the substantially collimated light. In other words, almost all the light components generated by the LED 14 (14a or 14b) can be extracted to be the collimated light by the LED collimator 15 having the convex lens formed on its center and the paraboloid surface formed on the peripheral portion, and the use efficiency of the generated light can be improved.

Note that a light emission region of the LED collimator 15 is provided with the polarization converter 21. As clearly seen from FIG. 14(A), the polarization converter 21 is made of combination of a pillar-shaped light transmittable member having a parallelogram cross section (referred to as parallelogram pillar below) and a pillar-shaped light transmittable member having a triangle cross section (referred to as triangle pillar below), and a plurality of these elements are arranged in an array form in parallel to a surface orthogonal to an optical axis of the collimated light emitted from the LED collimator 15. Further, a polarization beam splitter (abbreviated as "PBS film" below) 2111 and a reflection film 2121 are alternately arranged at a boundary between the adjacent light transmittable members that are arranged in the array form. The emitting surface from which the light having entered the polarization converter 21 and being transmitted through the PBS film 2111 is emitted is provided with a λ/2 waveplate 213.

The emitting surface of the polarization converter 21 is further provided with the rectangular composite/diffusion block 16 as shown in FIG. 14(a). In other words, the light emitted from the LED 14 (14a or 14b) is formed as the collimated light by the function of the LED collimator 15, enters the composite/diffusion block 16, and is diffused by a texture 161 on the emission side of the composite/diffusion block 16, and then, reaches the light guiding body 17.

The light guiding body 17 is a member made of a light transmittable resin such as acrylic resin and shaped in a bar having a substantially triangle cross section (see FIG. 14(b)). As clearly seen from FIG. 13, the light guiding body 17 has a light-guiding-body light entering portion (surface) 171 facing an emitting surface of the composite/diffuse block 16 to interpose a first diffuse plate 18a therebetween, a light-guiding-body light reflecting portion (surface) 172 forming a tilt surface, and a light-guiding-body light emitting portion (including a light-guiding-body emitting surface) 173 facing the liquid crystal display panel 11 that is the liquid crystal display component to interpose a second diffuse plate 18b therebetween.

As shown in FIG. 13 that is a partial enlarged view of the light-guiding-body light reflecting portion (surface) 172 of the light guiding body 17, a lot of reflection surfaces 172a and joint surfaces 172b are alternately formed in a saw-teeth form on the light-guiding-body light reflecting portion (surface) 172. And, an angle "an" (n: a natural number of, for example, 1 to 130 in the present example) is formed by the reflection surface 172a (a right upward line component in the drawing) and a horizontal surface (in a right-and-left direction in the drawing) illustrated with a dashed dotted line in the drawing. As its one example, the angle "an" is set to be equal to or smaller than 43 degrees (but equal to or larger than 0 degree) here.

The light-guiding-body light entering portion (surface) 171 is formed to have a curved convex shape tilting toward the light source. In the manner, the collimated light emitted from the light emitting surface of the composite/diffuse block 16 is diffused through the first diffuse plate 18a, and enters the light-guiding-body light entering portion (surface) 171, and reaches the light-guiding-body light reflecting portion (surface) 172 while slightly bending (in other words, being polarized) upward to be upper than the light-guiding-body light entering portion (surface) 171 as clearly seen from the drawing. This light is reflected by the light-guiding-body light reflecting portion (surface) 172, and reaches the liquid crystal display panel 11 arranged on the upper side of the light-guiding-body light emitting portion 173 on the upper side of the drawing.

According to the display apparatus 1 descried in detail above, the light use efficiency and the unified illumination property can be more improved, and the apparatus including the modularized light source for the S-polarization wave can be manufactured to be downsized at a low cost. In the above-described explanation, note that the polarization converter 21 is attached at a subsequent stage of the LED collimator 15. The present invention is not limited to this arrangement. Arrangement of the polarization converter 21 in a light path extending to the liquid crystal display panel 11 can also provide the same function and effect.

Note that a lot of reflection surfaces 172a and joint surfaces 172b are alternately formed in the saw-teeth form on the light-guiding-body light reflecting portion (surface) 172. The illumination luminous flux is totally reflected on each reflection surface 172a, and propagates upward. Besides, the illumination luminous flux is caused as the substantially collimated diffuse luminous flux to enter the light-direction converting panel 54 for controlling the directionality by the narrow-angle diffuse plate arranged on the light-guiding-body light emission portion (surface) 173, and enters the liquid crystal display panel 11 in an oblique direction while being controlled in terms of the directionality as shown in FIG. 13. In the present embodiment, the light-direction converting panel 54 is arranged between the light-guiding-body light emitting surface 173 and the liquid crystal display panel 11. However, arrangement of the light-direction converting panel 54 on the emitting surface of the liquid crystal display panel 11 can also provide the same effect.

Second Embodiment of Light Source

Figure 15:
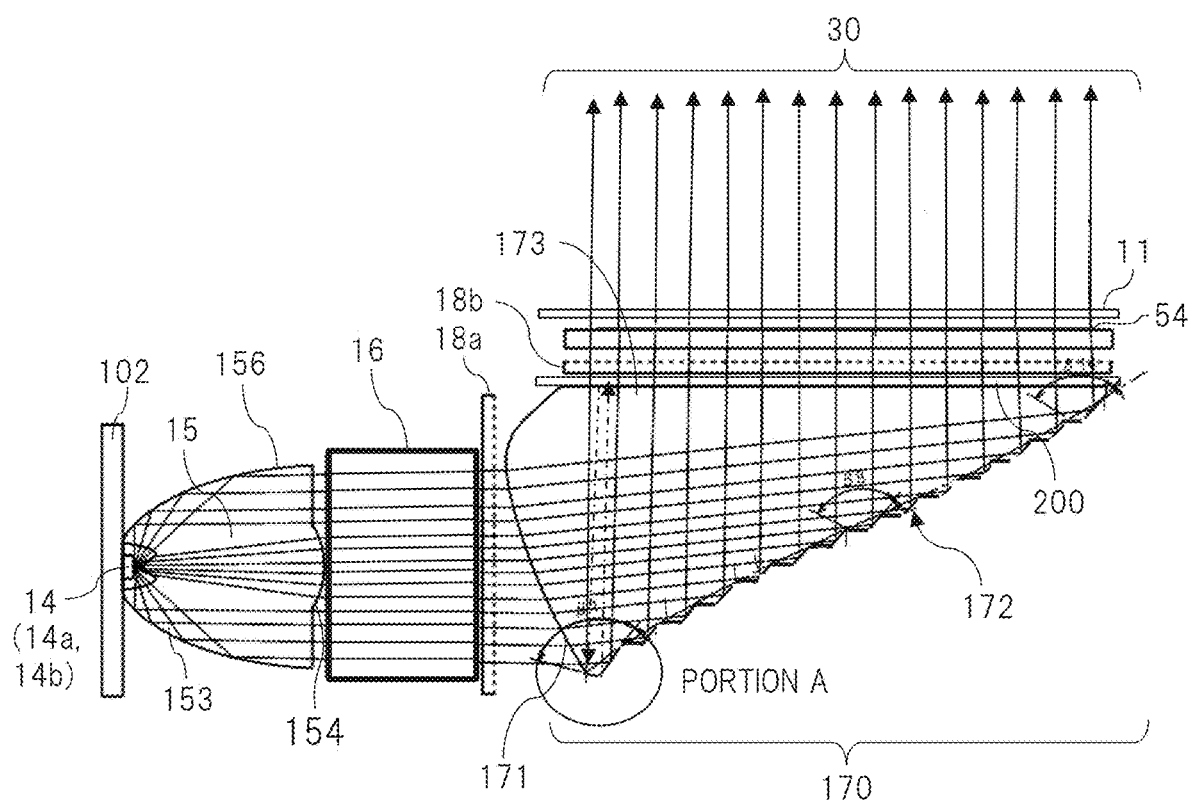
FIG. 15 is cross-sectional views showing an example of a specific configuration of a light source.
Figure 15:
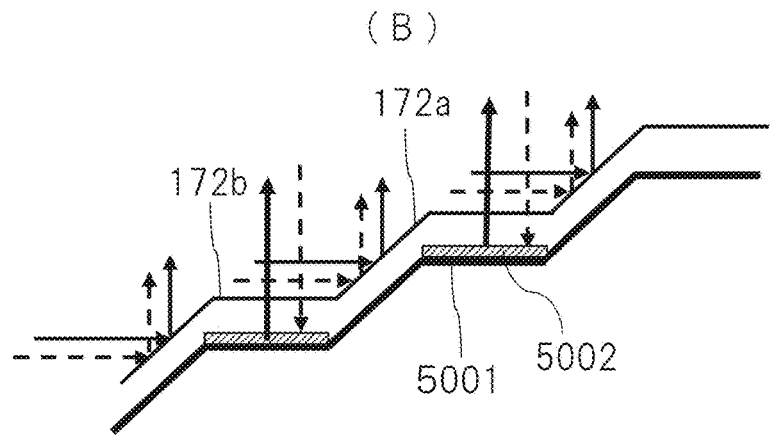

FIG. 15 shows another example of the configuration of the optical system such as the light source 13. As similar to the example shown in FIG. 13, a plurality of (in the present example, two) LEDs 14 (14a and 14b) configuring the light source are illustrated in FIG. 15. These LEDs 14 are attached at predetermined positions to correspond to the LED collimator 15. Note that each LED collimator 15 is made of, for example, a light-transmittable resin such as acrylic resin. And, as similar to the example shown in FIG. 13, the LED collimator 15 has, for example, a conically convex outer circumferential surface 156 formed by rotation of a paraboloid cross section, and an apex of the outer circumferential surface 156 has a concave portion 153 with a convex portion (in other words, a convex lens surface) 157 at center of the apex. And, center of a plane portion of the LED collimator 15 has a convex lens surface 154 that protrudes outward (or may be a concave lens surface that is recessed inward) Note that the paraboloid surface 156 forming the conically-shaped outer circumferential surface of the LED collimator 15 is set within a range of an angle allowing the light peripherally emitted from the LED element 14 to be totally reflected inside the paraboloid surface 156, or forms the reflection surface.

The LEDs 14 (14a, 14b) are arranged at predetermined positions, respectively, on the surface of the LED board 102 that is its circuit board. The LED board 102 is arranged and fixed so that each of the LED element 14 (14a or 14b) on the surface is positioned at center of the concave portion 153 of the LED collimator 15.

In such a configuration, among the light emitted from the LED element 14 (14a or 14b) by the LED collimator 15, particularly the light emitted upward (in the right direction in the drawing) from the center of the LED is collected to form the substantially collimated light by the two convex lens surfaces 157 and 154 forming the outer shape of the LED collimator 15. The light peripherally emitted from other portions is reflected by the paraboloid surface 156 forming the conically-shaped outer circumferential surface of the LED collimator 15, and is similarly collected to form the substantially collimated light. In other words, almost all the light components generated by the LED 14 (14a or 14b) can be extracted to be the collimated light by the LED collimator 15 having the convex lens formed on its center and the paraboloid surface formed on the peripheral portion, and the use efficiency of the generated light can be improved.

In FIG. 15(A), note that a light emission region of the LED collimator 15 is provided with the light guiding body 170 to interpose the first diffuse plate 18a therebetween. The light guiding body 170 is a member made of, for example, a light transmittable resin such as acrylic resin and shaped in a bar having a substantially triangle cross section. As clearly seen from FIG. 15(A), the light guiding body 170 has a light-guiding-body light entering portion (surface) 171 of the light guiding body 170, the portion facing an emitting surface of the composite/diffuse block 16 to interpose the first diffuse plate 18a therebetween, a light-guiding-body light reflecting portion (surface) 172 forming a tilt surface, and a light-guiding-body light emitting portion (surface) 173 facing the liquid crystal display panel 11 that is the liquid crystal display component to interpose a reflection-type light polarizer 200 therebetween.

The reflection-type light polarizer 200 having, for example, a property that reflects the P-polarization light but transmits the S-polarization light is adopted. In the manner, by this reflection-type light polarizer 200, the P-polarization light of the natural light emitted from the LED that is the light source is converted to the S-polarization light when being reflected, being transmitted through a λ/4 waveplate 5002 arranged on the light-guiding-body light reflecting portion 172 as shown in FIG. 15(B), being reflected by a reflection surface 5001, and being transmitted again through the λ/4 waveplate 5002. In the manner, all the luminous fluxes entering the liquid crystal display panel 11 are unified to be the S-polarization light.

Similarly, the reflection-type light polarizer 200 having, for example, a property that reflects the S-polarization light but transmits the P-polarization light may be adopted. In the manner, by this reflection-type light polarizer 200, the S-polarization light of the natural light emitted from the LED that is the light source is converted to the P-polarization light when being reflected, being transmitted through the λ/4 waveplate 5002 arranged on the light-guiding-body light reflecting portion 172 as shown in FIG. 15(B), being reflected by the reflection surface 5001, and being transmitted again through the λ/4 waveplate 5002. In the manner, all the luminous fluxes entering the liquid crystal display panel 52 are unified to be the P-polarization light. The light polarization can be converted even by the above-described configuration.

Third Example of Light Source

Another example of the configuration of the optical system such as the light source will be explained with reference to FIG. 12. In this example, as shown in FIG. 12, the divergence luminous flux of the natural light (that is mixture of the P-polarization light and the S-polarization light) emitted from the LED 14 is converted to the substantially collimated luminous flux by a collimator lens 18, and is reflected toward the liquid crystal display panel 11 by the reflection-type light guiding body 304. The reflected light enters a reflection-type light polarizer 206 arranged between the liquid crystal display panel 11 and the reflection-type light guiding body 304. A specific polarization wave (for example S-polarization wave) is reflected by the reflection-type light polarizer 206, the reflected light is transmitted through a surface connecting a reflection surface of the reflection-type light guiding body 304, is reflected by a reflection plate 271 arranged facing an opposite surface of the reflection-type light guiding body 304, and is transmitted through the λ/4 waveplate 270 that is a waveplate twice, and therefore, is converted in terms of light polarization. The polarization-converted light (for example P-polarization wave) is transmitted through the reflection-type light guiding body 304 and the reflection-type light polarizer 206, enters the liquid crystal display panel 11, and is modulated to the video light. In this case, when planes of the specific polarization wave and the polarization-converted wave are matched with each other, the light use efficiency is double as high as the regular one, and a polarization degree (in other words, extinction ratio) of the reflection-type light polarizer 206 can be combined with an extinction ratio of the entire system. Therefore, when the light source of the present embodiment is used, the contrast ratio of the air floating video display apparatus is significantly improved.

As a result, in the present embodiment, the natural light emitted from the LED 14 is unified to have the specific polarization wave (such as the P-polarization wave). As similar to the above-described example, a plurality of LEDs 14 configuring the light source are arranged (however, only one LED is illustrated in FIG. 12 because the drawing is a vertical cross-sectional view), and these LEDs 14 are attached at predetermined positions to correspond to the LED collimator 18. Note that each LED collimator 18 is made of, for example, a light-transmittable resin such as acrylic resin or glass. And, as similar to the above description, the LED collimator 18 has, for example, a conically convex outer circumferential surface formed by rotation of a paraboloid cross section, and an apex of the outer circumferential surface has a concave portion with a convex portion (in other words, a convex lens surface) at center of the apex. And, center of a plane portion of the LED collimator 18 has a convex lens surface that protrudes outward (or may be a concave lens surface that is recessed inward). Note that the paraboloid surface forming the conically-shaped outer circumferential surface of the LED collimator 18 is set within a range of an angle allowing the light peripherally emitted from the LED element 14 to be totally reflected inside the paraboloid surface, or forms the reflection surface.

The LEDs 14 are arranged at predetermined positions, respectively, on the surface of the LED board 102 that is its circuit board. The LED board 102 is arranged and fixed so that each of the LED element 14 on the surface is positioned at center of the concave portion of the LED collimator 18 to correspond to the LED collimator 18.

In such a configuration, among the light emitted from the LED 14 by the LED collimator 18, particularly the light emitted from the center of the LED is collected to form the substantially collimated light by the two convex lens surfaces forming the outer shape of the LED collimator 18. The light peripherally emitted from other portions is reflected by the paraboloid surface forming the conically-shaped outer circumferential surface of the LED collimator 18, and is similarly collected to form the substantially collimated light. In other words, almost all the light components generated by the LED 14 can be extracted to be the collimated light by the LED collimator 18 having the convex lens formed on its center and the paraboloid surface formed on the peripheral portion, and the use efficiency of the generated light can be improved.

Fourth Example of Light Source

Further, another example of the configuration of the optical system such as the light source will be explained with reference to FIG. 18. In FIG. 18, two optical sheets (in other words, diffuse sheets, diffuse films) 207 that convert the diffuse properties are used for the light emission region of the LED collimator 18, and the light emitted from the LED collimator 18 is caused to enter a gap between the two optical sheets 207. This optical sheet 207 converts the diffuse properties in the vertical direction (up-and-down direction, in-screen vertical direction) and the horizontal direction (front-and-back direction, in-screen horizontal direction) in the drawing configuring a plane. When the optical sheet 207 is made of one sheet, the diffuse properties in the vertical direction and the horizontal direction are controlled by fine shapes of front and back surfaces of the sheet. Alternatively, a plurality of optical sheets (diffuse sheets) may be used so as to separately play roles of the functions, respectively. By the front and back surface shapes of the optical sheet 207, the diffuse angle of the light in the screen vertical direction emitted from the LED collimator 18 is matched with the width of the vertical surface of the reflection surface of the optical sheet (diffuse sheet) 207. While taking the number of LEDs 14 and the divergence angle from the optical element (optical sheet 207) as design parameters, the diffuse angle in the horizontal direction may be optimally designed so that the surface density of the luminous flux emitted from the liquid crystal display panel 11 is unified. In other words, the diffuse properties in the present embodiment are controlled by the surface shapes of one or more optical sheets (diffuse sheets) 207 in place of the light guiding body 304. In the present embodiment, the light polarization is converted by the same method as that of the third example of the light source. On the other hand, the light polarization may be first converted by the polarization converter 21 arranged between the LED collimator 18 and the optical sheet 207, and then, the light-source light may be caused to enter the optical sheet 207.

The reflection-type light polarizer 206 having, for example, a property that reflects the S-polarization light but transmits the P-polarization light is adopted. In the manner, the S-polarization light of the natural light emitted from the LED 14 that is the light source is converted to the P-polarization light when being reflected by the reflection-type light polarizer 206, being transmitted through the waveplate 270, being reflected by the reflection surface 271, and being transmitted again through the waveplate 270, and then, the light enters the liquid crystal display panel 11. An optimal value of a thickness of this waveplate 270 is required to be adopted based on an incident angle of the light beam on the waveplate 207, and the optimal value is in a range of λ/16 to λ/4.

Fifth Example of Light Source

Another example of the configuration of the optical system such as the light source will be explained with reference to FIG. 19. As shown in FIG. 19(C), in the light source 13 in the present embodiment, a light emission region of the LED collimator 18 is provided with a polarization converter 501, and the natural light emitted from the LED element (LED 14) is unified to have the specific polarization wave by the polarization converter 501, and is caused to enter an optical element 81 for controlling the diffuse properties. Then, in the optical element 81, light distribution property toward the reflection surface of the reflection-type light guiding body 200 is optimized by control of the diffuse properties of the incident light in the vertical direction (up-and-down direction) and the horizontal direction (front-and-back direction) shown in FIG. 19. The surface of the reflection-type light guiding body 200 is provided with an irregular surface pattern 502 as shown in FIG. 19(B), and reflects incident light emitted from the optical element 81 toward a video display apparatus (not illustrated) arranged facing the reflection-type light guiding body 200 to provide the desired diffuse properties. The arrangement accuracy of the LED element (the LED 14) that is a light source and the LED collimator 18 greatly influences the efficiency of the light source. Therefore, typically, the optical axis accuracy is required to be an accuracy of about 50 μm. Therefore, the present inventor has employed the following configuration as a countermeasure against the problem of a decrease in mounting accuracy due to expansion of the LED collimator 18 caused by heat generation of the LED 14. That is, in the present embodiment, as shown in FIGS. 19(A) and 19(B), a light source unit 503 structure is made by integrating some LED elements (LEDs 14) and LED collimators 18, and a single or a plurality of (three in this example) light source units 503 are used in the light source to reduce the decrease in mounting accuracy described above.

Figure 19:
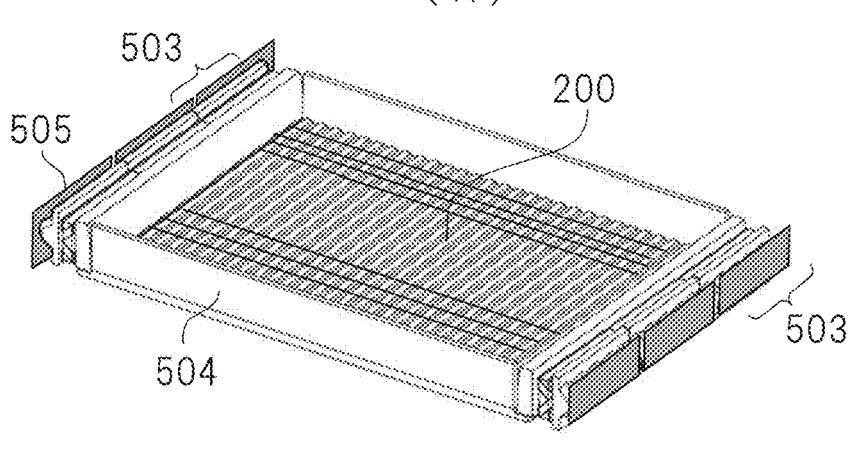
FIG. 19 is diagrams showing an example of a specific configuration of a light source according to an embodiment.
Figure 19:
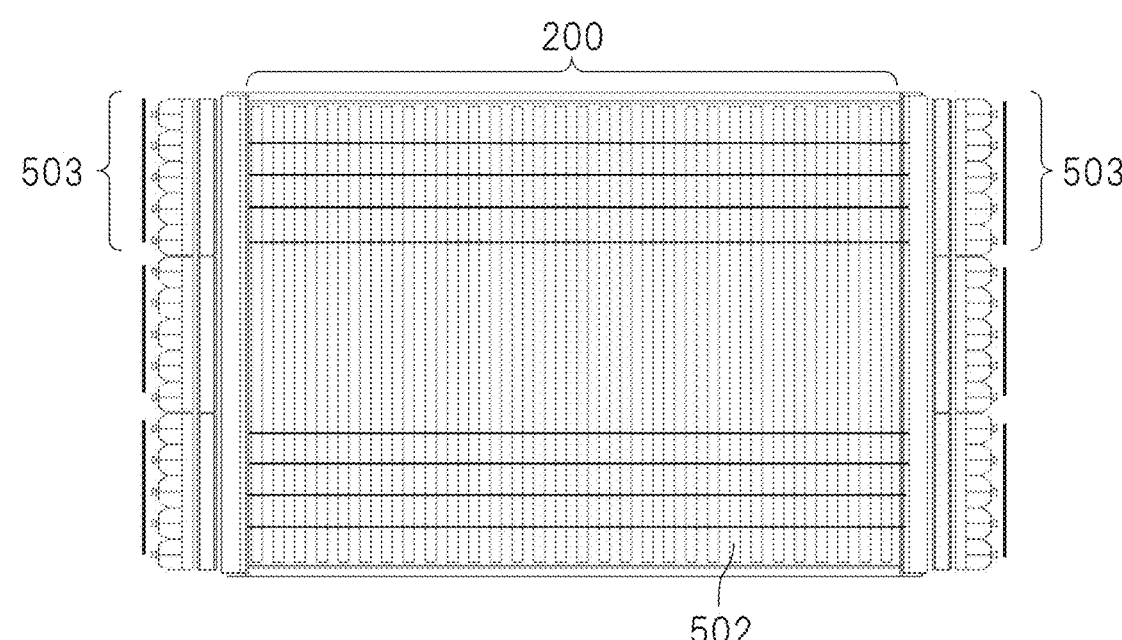
Figure 19:
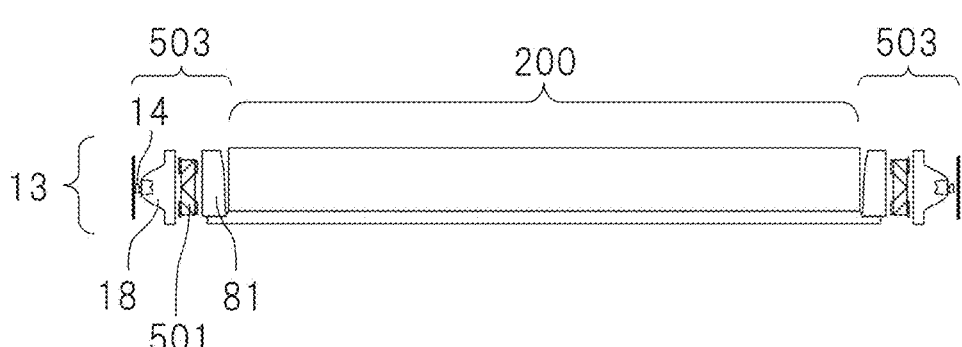

In the embodiment shown in FIGS. 19(A), 19 (B), 19(C), a plurality of (six in total) light source units 503 having the light LED elements and the LED collimators 18 integrated together are incorporated at each of longitudinal (right-and-left direction in the drawing) both ends of the reflection-type light guiding body 200. In the present embodiment, three light source units 503 arranged in the in-screen vertical direction (up-and-down direction in FIG. 19(B)) are incorporated for each of right and left sides of the reflection-type light guiding body 200. This achieves luminance unification of the light source 13. A plurality of irregular surface patterns 502 substantially parallel to the light source unit 503 are formed on the reflection surface (a surface having the irregular surface pattern 502 formed thereon in FIG. 19(B)) of the reflection-type light guiding body 200. A cross section in which the surface irregularities of the irregular surface pattern 502 are formed is a surface in FIG. 19(C), a direction in which the surface irregularities of the irregular surface pattern 502 are repeated is a right-and-left direction in FIG. 19(B), and a direction in which one surface irregularity extends is an up-and-down direction in FIG. 19(B). One irregular surface pattern 502 also has a polyhedron formed on its surface. This enables the amount of light entering the video display apparatus to be controlled with high accuracy. Though the shape of the reflection surface of the reflection-type light guiding body 200 has been described as the irregular surface pattern 502 in the present embodiment, the shape is not limited thereto, but the reflection surface may be patterned with regularly or irregularly patterned shapes, such as a triangular surface or a corrugated surface, and the patterned surface shape may be configured to control a light distribution pattern from the reflection-type light guiding body 200 toward the video display apparatus. In addition, as shown in FIG. 19(A), it is preferred that a side surface (a side surface not provided with the light source unit 503) of the reflection-type light guiding body 200 be provided with a light block wall 504 in order to prevent the light controlled by the LED collimator 18 from leaking outside from the light source 13, and that the LED element (the LED

14) be designed to have heat dissipation performance enhanced by a metallic base plate 505 provided outside.

<Lenticular Lens>

A function of a lenticular lens configured to control the diffusion properties of the emission light emitted from the display apparatus 1 will be described below. By the lenticular lens having an optimized lens shape, the light emitted from the display apparatus 1 described above can be transmitted through or reflected by a window glass (FIG. 1) to efficiently provide the air floating video. In other words, the present embodiment is configured so that, for the video light emitted from the display apparatus 1, two lenticular lends are combined or a sheet having microlens arrays arranged in a matrix for controlling the diffusion properties is provided, and therefore, the luminance (in other words, the relative luminance) of the video light in X-axis and Y-axis directions in the screen (in FIG. 17) can be controlled in accordance with its reflection angle (0 degree in the vertical direction). In the present embodiment, by such a lenticular lens, the luminance property in the vertical direction (Y-axis direction) is made sharper than the related art as shown in FIG. 17(B), and besides, a balance in the directionality between the up and down directions (positive and negative directions of the Y-axis) is changed, and therefore, the luminance (relative luminance) of light due to reflection and/or diffusion can be increased. Thus, the present embodiment can provide the video light having the narrow diffusion angle (in other words, the high rectilinear propagation property) and having only the specific polarization component such as video light emitted from a surface-emitting laser video source, can reduce the ghost image generated by the retroreflection optical member in the case of using the related art, and can control the air floating video based on the retroreflection so as to be efficiently delivered to the eyes of the viewer.

In addition, the light source described above is used to provide a significantly narrow-angle directionality property both in the X-axis direction and in the Y-axis direction for the diffusion properties (referred to as "related art" in the drawing) of the emission light emitted from a general liquid crystal display panel shown in FIGS. 17(A) and 17(B), and therefore, the display apparatus configured to emit the specific polarization wave emitting the video luminous flux almost parallel to the specific direction can be achieved.

FIG. 16 shows an example of a property of the lenticular lens adopted in the present embodiment. This example particularly shows a property in the X-direction (vertical direction) in FIG. 16(A). In FIG. 16(B), a property "0" shows a luminance property, a peak of which in the light emission direction shifts upward by an angle of about 30 degrees from the vertical direction (0 degree) and which is symmetrical between the up and down directions. In addition, a property "A" and a property B further show examples of a property in which the video light above the peak luminance is collected at about 30 degrees to enhance the luminance (relative luminance). Therefore, in the property "A" and the property "B", the light luminance (relative luminance) rapidly decreases more than that of the property "0" at an angle exceeding 30 degrees.

In other words, when the video luminous flux emitted from the display apparatus 1 is caused to enter the retroreflection optical member 2, the emission angle and/or the viewing angle of the video light having the narrow angle unified by the light source 13 can be controlled by using the optical system including the lenticular lens described above, and therefore, the degree of freedom of placement of the retroreflection optical member 2 can be significantly improved. Consequently, the degree of freedom related to the image forming position of the air floating video to be formed at a desired position after being reflected by or transmitted through the window glass can be significantly improved. Consequently, the light having the narrow diffusion angle (the high rectilinear propagation property) and having only the specific polarization component can be efficiently delivered to the eyes of the viewer inside or outside a room. This enables the viewer to correctly recognize the video light emitted from the display apparatus 1 and obtain its information even when the intensity (the corresponding luminance) of the video light emitted from the display apparatus 1 decreases. In other words, by reducing the output of the display apparatus 1, a display apparatus having low power consumption can be achieved.

In place of a related-art HUD apparatus, the present embodiment can provide an air floating video display apparatus that can display a required video as an air floating video in a vehicle, particularly in a space between a windshield and a driver, without making the windshield reflect the video. Thus, this can provide an air floating video display apparatus that is applicable to automobile models having different body designs.

In addition, the present embodiment can achieve an air floating video display apparatus that is applicable to automobile models having different windshield shapes and/or inclinations which are obstacle factors of installation in a related-art HUD, and that can display an air floating video with high visual recognition.

Various embodiments have been described in detail above. However, the present invention is not limited to the foregoing embodiments, and includes various modifications. For example, in the above-described embodiments, the entire apparatus has been explained in detail for easily understanding the present invention, and the embodiments are not always limited to the one including all structures explained above. Also, a part of the structure of one embodiment can be replaced with the structure of another embodiment, and besides, the structure of another embodiment can be added to the structure of one embodiment. Further, another structure can be added to/eliminated from/replaced with a part of the structure of each embodiment.

EXPLANATION OF REFERENCE CHARACTERS

1 . . . display apparatus, 2 . . . retroreflection optical member, 3 . . . stereoscopic image, 4 . . . video display apparatus, 10 . . . light source, 11 . . . liquid crystal display panel, 21 . . . polarization converter, 6 . . . windshield, 8 . . . eye point, 100 . . . transmittable plate, 1000 . . . air floating video display apparatus, 101 . . . polarization splitter, 12 . . . absorption-type light polarizer, 13 . . . light source, 41 . . . opening portion, 110 . . . enclosure, 203 . . . light guiding body, 2140 . . . reflection-type light polarizer, 205/271 . . . reflection sheet, 206/270 . . . waveplate, 3/3b . . . air floating video, 301 . . . ghost image of air floating video, 2100 . . . retroreflection optical member, 300/2110/2120 . . . reflection mirror, 60/220 . . . air floating video (air floating image), G1/G2/G3/G4/G6 . . . ghost image of air floating video, R1 . . . air floating video, 401 . . . concave mirror, 403 . . . optical element, 404 . . . video display apparatus (liquid crystal display panel)

28

The invention claimed is:

1. An air floating video display apparatus forming an air floating video comprising:
an opening portion configured to transmit video light of a specific polarization wave forming the air floating video therethrough;
a transparent member arranged at the opening portion and configured to transmit the video light therethrough;
a display panel serving as a video source;
a light source configured to supply light having specific polarization directionality to the video source;
a retroreflection optical member having a retroreflection surface provided with a waveplate;
one or more reflection mirrors; and
a polarization splitter arranged in a space connecting the video source and the retroreflection optical member,
wherein the video light of the specific polarization wave emitted from the video source is once transmitted through the polarization splitter,
the video light transmitted through the polarization splitter is reflected by a first reflection mirror serving as the reflection mirror toward the retroreflection optical member,
the video light reflected by the first reflection mirror is converted in terms of light polarization by the retroreflection optical member to convert one polarization wave of the video light to another polarization wave,
the converted video light is reflected again by the first reflection mirror,
the video light reflected again by the first reflection mirror is reflected by the polarization splitter toward the opening portion,
the air floating video that is an actual image based on the video light reflected by the polarization splitter is displayed outside the transparent member of the opening portion, and
a forming position of the air floating video is changed by a structure changing a distance from the video source to the retroreflection optical member.
2. The air floating video display apparatus according to claim 1,
wherein at least one reflection mirror serving as the reflection mirror is arranged in a light path connecting the air floating video and the polarization splitter, and
the forming position of the air floating video is changed by turning of the at least one reflection mirror in the light path.
3. The air floating video display apparatus according to claim 1,
wherein at least one reflection mirror serving as the reflection mirror is arranged in a light path connecting the air floating video and the polarization splitter, and
a reflection mirror closest to the air floating video among the at least one reflection mirror is made of a metallic multilayer film configured to reflect the specific polarization wave of the video light but transmit another polarization wave.
4. The air floating video display apparatus according to claim 1,
wherein the polarization splitter is made of a reflection-type light polarizer or a metallic multilayer film configured to reflect the specific polarization wave.
5. The air floating video display apparatus according to claim 1,
wherein an absorption-type light polarizer is arranged on at least one surface of the transparent member.

6. The air floating video display apparatus according to claim 1, wherein, in the transparent member, a portion configured to transmit the video light therethrough is made of a transparent body, and a portion configured not to transmit the video light therethrough is made of a light block member.

7. The air floating video display apparatus according to claim 1, wherein an anti-reflection film is arranged on a video display surface of the display panel, an absorption-type light polarizer is arranged on the display panel, and the reflected light is absorbed by the absorption-type light polarizer.

8. The air floating video display apparatus according to claim 1, wherein a video displayed on the display panel is a video configured to correct a distortion of an image generated in an optical system forming the air floating video.

9. An air floating video display apparatus forming an air floating video comprising:

an opening portion configured to transmit video light of a specific polarization wave forming the air floating video therethrough;

a transparent member arranged at the opening portion and configured to transmit the video light therethrough;

a display panel serving as a video source;

a light source configured to supply light having specific polarization directionality to the video source;

a retroreflection optical member having a retroreflection surface provided with a waveplate;

a plurality of reflection mirrors; and a polarization splitter arranged in a space connecting the video source and the retroreflection optical member, wherein the video light of the specific polarization wave emitted from the video source is once transmitted through the polarization splitter, the video light transmitted through the polarization splitter is reflected by a first reflection mirror of the reflection mirrors toward the retroreflection optical member, the video light reflected by the first reflection mirror is converted in terms of light polarization by the retroreflection optical member to convert one polarization wave to another polarization wave, the converted video light is reflected again by the first reflection mirror, the video light reflected again by the first reflection mirror is reflected by the polarization splitter toward the opening portion, the air floating video that is an actual image based on the video light reflected by the polarization splitter is displayed outside the transparent member of the opening portion, a forming position of the air floating video is changed by a structure changing a distance from the video source to the retroreflection optical member, a surface roughness of a reflection surface of the retroreflection optical member is set so that a ratio of a blur amount of the air floating video to a pixel size of the video source is 40% or less, the light source includes: a point-type or surface-type light source; an optical member configured to reduce a divergence angle of light emitted from the light source; a polarization converter configured to unify the light emitted from the light source to be polarization light having specific directionality; and a light guiding body having a reflection surface configured to propagate light to the video source, the video light is adjusted by a shape and a surface roughness of a reflection surface arranged on the light source, and video luminous flux having a narrow divergence angle emitted from the video source is reflected by the retroreflection optical member to aerially form the air floating video.

10. The air floating video display apparatus according to claim 9, wherein the surface roughness of the reflection surface of the retroreflection optical member is set to 160 nm or less, the light source includes: a point-type or surface-type light source; an optical member configured to reduce a divergence angle of light emitted from the light source; a polarization converter configured to unify the light emitted from the light source to be polarization light having a specific directionality; and a light guiding body having a reflection surface configured to propagate light to the video source, the light guiding body faces the video source, and its inside or its surface has the reflection surface configured to reflect the light emitted from the light source toward the video source, and light is propagated to the video source by the reflection surface, the video source modulates light intensity in accordance with a video signal, and the video luminous flux having a narrow divergence angle emitted from the video source is reflected by the retroreflection optical member to aerially form the air floating video.

11. The air floating video display apparatus according to claim 9, wherein, in the light source, a part or all of a divergence angle of luminous flux is adjusted by a shape and a surface roughness of the reflection surface of the light source so that a light beam divergence angle of the display panel is within ±30 degrees.

12. The air floating video display apparatus according to claim 9, wherein, in the light source, a part or all of a divergence angle of luminous flux is adjusted by a shape and a surface roughness of the reflection surface of the light source so that a light beam divergence angle of the display panel is within ±15 degrees.

13. The air floating video display apparatus according to claim 9, wherein, in the light source, a part or all of a divergence angle of luminous flux is adjusted by a shape and a surface roughness of the reflection surface of the light source so that a horizontal divergence angle and a vertical divergence angle of a light beam divergence angle of the display panel are different from each other.

14. The air floating video display apparatus according to claim 9, wherein the light source has a contrast performance provided by multiplying a resultant contrast based on property of a polarization plate arranged on a light entering surface and a light emitting surface of the video source by inverse of an efficiency of polarization conversion in the polarization converter.

15. The air floating video display apparatus according to claim 9, comprising:

a reflection-type light polarizer; and the waveplate arranged on a video-light entering surface of the retroreflection optical member, wherein the reflection-type light polarizer is arranged so that the video light emitted from the video source is once reflected by the reflection-type light polarizer and enters the retroreflection optical member, and polarization wave of the video light is converted to another polarization wave when being transmitted twice through the waveplate, and thus, the converted video light is transmitted through the reflection-type light polarizer.

16. The air floating video display apparatus according to claim 15, wherein the light source has a contrast performance provided by multiplying a resultant contrast based on properties of two polarization plates arranged on a light entering surface and a light emitting surface of the video source by inverse of an efficiency of polarization conversion in the polarization converter and inverse of a cross transmittance of the reflection-type light polarizer.

17. An air floating video display apparatus forming an air floating video comprising:

an opening portion configured to transmit video light of a specific polarization wave forming the air floating video therethrough;

a transparent member arranged at the opening portion and configured to transmit the video light therethrough;

a display panel serving as a video source;

a light source configured to supply light having specific polarization directionality to the video source;

a retroreflection optical member having a retroreflection surface provided with a waveplate;

a plurality of reflection mirrors; and a polarization splitter arranged in a space connecting the video source and the retroreflection optical member, wherein the video light of the specific polarization wave emitted from the video source is once transmitted through the polarization splitter, the video light transmitted through the polarization splitter is reflected by a first reflection mirror of the reflection mirrors toward the retroreflection optical member, the video light reflected by the first reflection mirror is converted in terms of light polarization by the retroreflection optical member to convert one polarization wave to another polarization wave, the converted video light is reflected again by the first reflection mirror, the video light reflected again by the first reflection mirror is reflected by the polarization splitter toward the opening portion, the air floating video that is an actual image based on the video light reflected by the polarization splitter is displayed outside the transparent member of the opening portion, the apparatus includes a light block member configured to prevent video light having a divergence angle exceeding a specific angle emitted from the video source from entering the retroreflection optical member, a forming position of the air floating video is changed by a structure changing a distance from the video source to the retroreflection optical member, a surface roughness of a reflection surface of the retroreflection optical member is set so that a ratio of a blur amount of the air floating video to a pixel size of the video source is 40% or less, the light source includes: a point-type or surface-type light source; an optical member configured to reduce a divergence angle of light emitted from the light source; a polarization converter configured to unify the light emitted from the light source to be polarization light having specific directionality; and a light guiding body having a reflection surface configured to propagate light to the video source, the apparatus includes a reflection-type light polarizer, the light guiding body faces the video source, its inside or its surface has a reflection surface configured to reflect the light emitted from the light source toward the video source, and performs polarization conversion to convert light having specific polarization directionality reflected by the reflection-type light polarizer to a polarization wave allowed to be transmitted through the reflection-type light polarizer by transmitting the light through a surface connecting the adjacent reflection surfaces of the light guiding body, reflecting the light at a reflection plate arranged on a surface of the light guiding body opposite to a surface in contact with the video source, and transmitting the light twice through a waveplate arranged on an upper surface of the reflection plate, and transmits the converted light through the light guiding body to propagate the converted light toward the video source, the video source modulates light intensity in accordance with a video signal, in the light source, a part or all of a divergence angle of luminous flux emitted from the light source and entering the video source is adjusted by a shape and a surface roughness of the reflection surface arranged in the light source, and video luminous flux having a narrow divergence angle emitted from the video source is reflected by the retroreflection optical member to aerially form the air floating video.

18. The air floating video display apparatus according to claim 17, wherein, in the light source, a part or all of the divergence angle of the luminous flux is adjusted by a shape and a surface roughness of the reflection surface arranged in the light source, so that a light beam divergence angle of the display panel is within ±30 degrees.

19. The air floating video display apparatus according to claim 17, wherein, in the light source, a part or all of a divergence angle of luminous flux is adjusted by the shape and surface roughness of the reflection surface of the light source, so that a light beam divergence angle of the display panel is within ±10 degrees.

20. The air floating video display apparatus according to claim 17, wherein, in the light source, a part or all of a divergence angle of luminous flux is adjusted by the shape and surface roughness of the reflection surface of the light source, so that a horizontal divergence angle and a vertical divergence angle of a light beam divergence angle of the display panel are different from each other.

21. The air floating video display apparatus according to claim 20, wherein the light source has a contrast performance provided by multiplying a resultant contrast based on properties of two polarization plates arranged on a light entering surface and a light emitting surface of the display panel by inverse of a cross transmittance of the reflection-type light polarizer.

22. The air floating video display apparatus according to claim 17, wherein the light source has a contrast performance provided by multiplying a resultant contrast based on properties of two polarization plates arranged on a light entering surface and a light emitting surface of the display panel by inverse of a cross transmittance of the reflection-type light polarizer.

23. A light source for use in the air floating video display apparatus according to claim 22, wherein a divergence angle is within ±30 degrees.

24. The air floating video display apparatus according to claim 17, wherein the reflection-type light polarizer is arranged so that the video light emitted from the video source is once reflected by the reflection-type light polarizer and enters the retroreflection optical member, the waveplate is arranged on a video-light entering surface of the retroreflection optical member, and polarization wave of the video light is converted to another polarization wave when being transmitted twice through the waveplate, and thus, is transmitted through the reflection-type light polarizer.

25. The air floating video display apparatus according to claim 17, wherein the light source includes a plurality of light sources serving as the light sources for single video display element.

26. A light source for use in the air floating video display apparatus according to claim 25, wherein a divergence angle is within ±10 degrees.

27. The air floating video display apparatus according to claim 17, wherein the light source includes a plurality of surface-type emitting light sources having different light emitting directions serving as the light sources for single video display element.

28. A light source for use in the air floating video display apparatus according to claim 27, wherein a horizontal diffusion angle and a vertical diffusion angle are different from each other.

29. An air floating video display apparatus forming an air floating video comprising:

an opening portion configured to transmit video light of a specific polarization wave forming the air floating video therethrough;

a transparent member arranged at the opening portion and configured to transmit the video light therethrough;

a display panel serving as a video source;

a light source configured to supply light having specific polarization directionality to the video source;

a retroreflection optical member having a retroreflection surface provided with a waveplate;

a plurality of reflection mirrors; and a polarization splitter arranged in a space connecting the video source and the retroreflection optical member, wherein the video light of the specific polarization wave emitted from the video source is once transmitted through the polarization splitter, the video light transmitted through the polarization splitter is reflected by a first reflection mirror of the reflection mirrors toward the retroreflection optical member, the video light reflected by the first reflection mirror is converted in terms of light polarization by the retroreflection optical member to convert one polarization wave to another polarization wave, the converted video light is reflected again by the first reflection mirror, the video light reflected again by the first reflection mirror is reflected by the polarization splitter toward the opening portion, the air floating video that is an actual image based on the video light reflected by the polarization splitter is displayed outside the transparent member of the opening portion, a light block member configured to prevent video light having a divergence angle exceeding a specific angle emitted from the video source from entering the retroreflection optical member is arranged in the space connecting the video source and the retroreflection optical member, a surface roughness of a reflection surface of the retroreflection optical member is set so that a ratio of a blur amount of the air floating video to a pixel size of the video source is 40% or less, the light source includes: a point-type or surface-type light source; an optical member configured to reduce a divergence angle of light emitted from the light source; a light guiding body having a reflection surface configured to reflect the light emitted from the light source to propagate the light to the video source; and a waveplate and a reflection surface facing another surface of the light guiding body to be sequentially arranged in order from the light guiding body, the reflection surface of the light guiding body is arranged so as to reflect the light emitted from the light source and propagate the light to the video source facing the light guiding body, the apparatus includes a reflection-type light polarizer arranged between the reflection surface of the light guiding body and the video source, light having specific polarization directionality reflected by the reflection-type light polarizer is reflected by the reflection surface facing and being close to the another surface of the light guiding body, the reflected light is transmitted twice through the waveplate arranged between the light guiding body and the reflection surface to perform polarization conversion, and the converted light is transmitted through the reflection-type light polarizer to propagate light having specific polarization directionality to the video source, the video source modulates light intensity in accordance with a video signal, in the light source, a part or all of a divergence angle of luminous flux emitted from the light source and entering the video source is adjusted by a shape and a surface roughness of the reflection surface arranged in the light source, and video luminous flux having a narrow divergence angle emitted from the video source is reflected by the retroreflection optical member to aerially form the air floating video.

30. The air floating video display apparatus according to claim 29, wherein a shape of the retroreflection optical member is a concave or convex shape having a curvature radius of 200 mm or less relative to the video source.

31. An air floating video display apparatus forming an air floating video comprising:

an opening portion configured to transmit video light of a specific polarization wave forming the air floating video therethrough;

a transparent member arranged at the opening portion and configured to transmit the video light therethrough;

a display panel serving as a video source;

a light source configured to supply light having specific polarization directionality to the video source;

a retroreflection optical member having a retroreflection surface provided with a waveplate;

a reflection mirror; and a polarization splitter arranged in a space connecting the video source and the retroreflection optical member, wherein the video light of the specific polarization wave emitted from the video source is once transmitted through the polarization splitter, the video light transmitted through the polarization splitter is reflected by the reflection mirror toward the retroreflection optical member, the video light reflected by the reflection mirror is converted in terms of light polarization by the retroreflection optical member to convert one polarization wave to another polarization wave, the converted video light is reflected again by the polarization splitter, the video light reflected by the polarization splitter is reflected by the reflection mirror toward the opening portion, the air floating video that is an actual image based on the video light reflected by the reflection mirror is displayed outside the transparent member of the opening portion, the light source includes: a point-type or surface-type light source; an optical member configured to reduce a divergence angle of light emitted from the light source; a polarization converter configured to unify the light emitted from the light source to be polarization light having specific directionality; and a light guiding body having a reflection surface configured to propagate light to the video source, a surface roughness of a reflection surface of the retroreflection optical member is set so that a ratio of a blur amount of the air floating video to a pixel size of the video source is 40% or less, the light guiding body faces the video source, its inside or its surface has a reflection surface configured to reflect the light emitted from the light source toward the video source, light is propagated toward the video source by the reflection surface, the video source modulates light intensity in accordance with a video signal, a part or all of a divergence angle of luminous flux emitted from the light source and entering the video source is adjusted by a shape and a surface roughness of the reflection surface arranged in the light source, video luminous flux having a narrow divergence angle emitted from the video source is reflected by the retroreflection optical member to aerially form the air floating video, and a shape of the retroreflection optical member is a concave or convex shape having a curvature radius of 200 mm or more relative to the video source.

* * * * *